United States Patent
Michael et al.

(10) Patent No.: US 10,917,277 B2
(45) Date of Patent: Feb. 9, 2021

(54) TRANSMISSION DEVICE, TRANSMISSION METHOD, RECEPTION DEVICE, AND RECEPTION METHOD

(71) Applicant: SONY SEMICONDUCTOR SOLUTIONS CORPORATION, Atsugi (JP)

(72) Inventors: Lachlan Bruce Michael, Saitama (JP); Kazuyuki Takahashi, Chiba (JP); Satoshi Okada, Tokyo (JP)

(73) Assignee: SONY SEMICONDUCTOR SOLUTIONS CORPORATION, Atsugi (JP)

( * ) Notice: Subject to any disclaimer, the term of this patent is extended or adjusted under 35 U.S.C. 154(b) by 0 days.

(21) Appl. No.: 16/099,769

(22) PCT Filed: Jun. 23, 2017

(86) PCT No.: PCT/JP2017/023147
§ 371 (c)(1),
(2) Date: Nov. 8, 2018

(87) PCT Pub. No.: WO2018/008427
PCT Pub. Date: Jan. 11, 2018

(65) Prior Publication Data
US 2019/0182090 A1    Jun. 13, 2019

(30) Foreign Application Priority Data
Jul. 8, 2016   (JP) ................ 2016-135710

(51) Int. Cl.
*H04J 11/00* (2006.01)
*H04L 27/26* (2006.01)
(Continued)

(52) U.S. Cl.
CPC ........ *H04L 27/2628* (2013.01); *H04L 5/0007* (2013.01); *H04L 5/0053* (2013.01);
(Continued)

(58) Field of Classification Search
USPC ....... 370/210, 229, 230, 252, 310, 328, 329, 370/330, 341, 343, 345, 431, 433, 436, (Continued)

(56) References Cited

U.S. PATENT DOCUMENTS

2005/0094739 A1* 5/2005 Takesue ............ H04L 27/2657
375/260
2007/0274405 A1* 11/2007 Adachi ............. H04L 27/2679
375/260
(Continued)

FOREIGN PATENT DOCUMENTS

| JP | 2011-29922 A | 2/2011 |
| JP | 2015-70279 A1 | 4/2015 |
| JP | 2015-76690 A1 | 4/2015 |

OTHER PUBLICATIONS

Extended European Search Report dated Jun. 18, 2019 in European Patent Application No. 17824034.7, 9 pages.
(Continued)

*Primary Examiner* — Nguyen H Ngo
(74) *Attorney, Agent, or Firm* — Oblon, McClelland, Maier & Neustadt, L.L.P.

(57) ABSTRACT

The present technology relates to a transmission device, a transmission method, a reception device, and a reception method for sufficiently securing an information amount of additional information of a physical layer.
The transmission device generates and transmits an OFDM signal in which additional information of a physical layer is allocated to additional carriers in each of groups, the groups being obtained by grouping the additional carriers to be used
(Continued)

for transmission of the additional information, of carriers of the OFDM signal of one frame, into the groups of the number of groups according to a DFT size of when IDFT of the OFDM signal is performed. The reception device receives the OFDM signal, and acquires the additional information corresponding to the number of groups according to the DFT size from the OFDM signal. The present technology can be applied to, for example, transmission and reception of the OFDM signal.

7 Claims, 15 Drawing Sheets

(51) Int. Cl.
*H04L 5/00* (2006.01)
*H04W 72/04* (2009.01)
(52) U.S. Cl.
CPC .......... *H04L 27/26* (2013.01); *H04L 27/2602* (2013.01); *H04W 72/0446* (2013.01); *H04W 72/0453* (2013.01)
(58) Field of Classification Search
USPC ....... 370/437, 464, 465, 468, 470, 480, 482, 370/484
See application file for complete search history.

(56) References Cited

U.S. PATENT DOCUMENTS

| | | | |
|---|---|---|---|
| 2010/0177251 A1* | 7/2010 | Kimura | H04N 21/6112 348/726 |
| 2010/0202547 A1* | 8/2010 | Taga | H04L 27/2662 375/260 |
| 2010/0309383 A1* | 12/2010 | Matsumura | H04L 25/0232 348/725 |
| 2011/0019101 A1 | 1/2011 | Goto et al. | |
| 2011/0268172 A1* | 11/2011 | Hayashi | H04L 27/2647 375/229 |
| 2011/0317790 A1* | 12/2011 | Yokokawa | H04L 5/0048 375/329 |
| 2012/0250800 A1* | 10/2012 | Shankaraiah | H04L 27/2656 375/330 |
| 2015/0003809 A1* | 1/2015 | Matsuda | G11B 27/105 386/248 |
| 2015/0098520 A1 | 4/2015 | Nishikawa | |

OTHER PUBLICATIONS

International Search Report dated Sep. 12, 2017 in PCT/JP2017/023147, 1 page.

* cited by examiner

FIG. 9

| FFT SIZE | 8K (12 CARRIERS/SEGMENT) | | 16K (24 CARRIERS/SEGMENT) | | 32K (48 CARRIERS/SEGMENT) | |
|---|---|---|---|---|---|---|
| Group Index | Num. of Groups (Ng) | CARRIERS/ SEGMENT | Num. of Groups (Ng) | CARRIERS/ SEGMENT | Num. of Groups (Ng) | CARRIERS/ SEGMENT |
| 1 | 1 | 12 | 1 | 24 | 1 | 48 |
| 2 | 2 | 6 | 2 | 12 | 2 | 24 |
| 3 | 3 | 4 | 3 | 8 | 3 | 16 |
| 4 | 4 | 3 | 4 | 6 | 4 | 12 |
| 5 | 6 | 2 | 6 | 4 | 6 | 8 |
| 6 | 12 | 1 | 8 | 3 | 8 | 6 |
| 7 | ... | | 12 | 2 | 12 | 4 |
| 8 | | | 24 | 1 | 24 | 2 |
| 9 | | | | | 48 | 1 |
| ... | | | | | | |

FIG. 14

| BIT STRING | MEANING |
|---|---|
| 00000000 | FFT size=8k, GI=1/4, CONFIGURATION=13 SEGMENTS, Gp_Index=3 |
| 00000001 | FFT size=8k, GI=1/4, CONFIGURATION=12 SEGMENTS+1 SEGMENT, Gp_Index=3 |
| 00000010 | FFT size=8k, GI=1/8, CONFIGURATION=13 SEGMENTS, Gp_Index=3 |
| 00000011 | FFT size=8k, GI=1/8, CONFIGURATION=12 SEGMENTS+1 SEGMENT, Gp_Index=3 |
| 00000100 | FFT size=8k, GI=1/4, CONFIGURATION=13 SEGMENTS, Gp_Index=4 |
| ... | ... |
| 00001000 | FFT size=16k, GI=1/4, CONFIGURATION=13 SEGMENTS, Gp_Index=3 |
| 00001001 | FFT size=16k, GI=1/4, CONFIGURATION=12 SEGMENTS+1 SEGMENT, Gp_Index=3 |
| 00001010 | FFT size=16k, GI=1/8, CONFIGURATION=13 SEGMENTS, Gp_Index=3 |
| 00001011 | FFT size=16k, GI=1/8, CONFIGURATION=12 SEGMENTS+1 SEGMENT, Gp_Index=3 |
| 00001100 | FFT size=16k, GI=1/8, CONFIGURATION=10 SEGMENTS+2 SEGMENTS+1 SEGMENT, Gp_Index=3 |
| ... | |
| 10000000 | FFT size=32k, GI=1/4, CONFIGURATION=13 SEGMENTS, Gp_Index=3 |
| 10000001 | FFT size=32k, GI=1/4, CONFIGURATION=12 SEGMENTS+1 SEGMENT, Gp_Index=3 |
| 10000010 | FFT size=32k, GI=1/8, CONFIGURATION=13 SEGMENTS, Gp_Index=3 |
| 10000011 | FFT size=32k, GI=1/8, CONFIGURATION=12 SEGMENTS+1 SEGMENT, Gp_Index=3 |
| ... | |
| 11111111 | Reserved |

SIGNALING

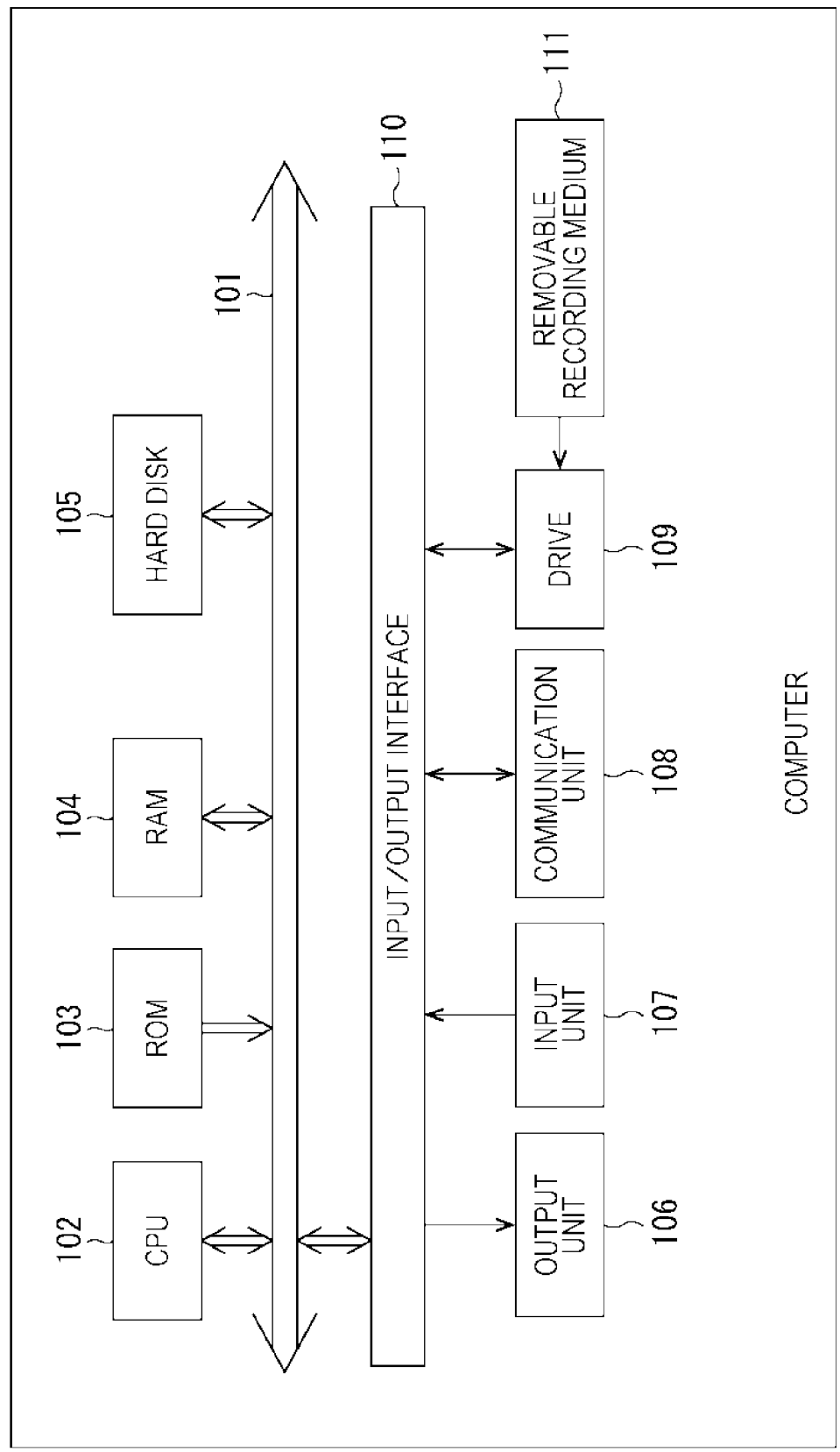

TRANSMISSION DEVICE, TRANSMISSION METHOD, RECEPTION DEVICE, AND RECEPTION METHOD

TECHNICAL FIELD

The present technology relates to a transmission device, a transmission method, a reception device, and a reception method, and more particularly to, for example, a transmission device, a transmission method, a reception device, and a reception method for sufficiently securing an information amount of additional information of a physical layer.

BACKGROUND ART

For example, in the Integrated Services Digital Broadcasting-Terrestrial (ISDB-T), which is a standard for terrestrial digital broadcasting, division of a channel (physical channel), which is a 6-MHz frequency band in an ultra high frequency (UHF) band, into 13 segments, and the like are defined (for example, see Non-Patent Document 1).

Furthermore, in ISDB-T, it is assumed that one-segment broadcasting for portable terminals is possible by partial reception, that is, by center one segment out of the 13 segments.

Moreover, in ISDB-T, three transmission modes: modes 1, 2, and 3 with different carrier intervals (subcarrier intervals) of orthogonal frequency division multiplexing (OFDM) signals are defined.

In the current terrestrial digital broadcasting (terrestrial digital broadcasting conforming to ISDB-T), only the mode 3 of the modes 1 to 3 is operated.

In the mode 3, 8K points (1K is 1024) are adopted as the DFT size of when inverse discrete Fourier transform (IDFT) of the OFDM signal is performed, that is, the FFT size of when inverse fast Fourier transform (IFFT) of the OFDM signal is performed.

CITATION LIST

Non-Patent Document

Non-Patent Document 1: "ARIB STD-B31 Version 2.2", Association of Radio Industries and Businesses

SUMMARY OF THE INVENTION

Problems to be Solved by the Invention

At present, formulation of the standard of next-generation terrestrial digital broadcasting (hereinafter also referred to as advanced terrestrial digital broadcasting) has been started. It is expected that, in the advanced terrestrial digital broadcasting, a narrower carrier interval than the carrier interval in the mode 3 of the current terrestrial digital broadcasting is adopted and an FFT size larger than the 8K points of the current terrestrial digital broadcasting, for example, 16K points, 32K points, or the like, is adopted.

IFFT of the OFDM signal is performed in units of OFDM symbols, for example. The symbol length (time) of the OFDM symbol becomes larger as the carrier interval becomes narrower (the number of carriers becomes larger) and the FFT size becomes larger.

In the current terrestrial digital broadcasting, 204 OFDM symbols configure an OFDM signal of one frame. Now, assuming that the FFT size is made large and an OFDM frame that is the OFDM signal of one frame is configured by 204 OFDM symbols, similarly to the current terrestrial digital broadcasting, for example, the symbol length becomes large and as a result, the frame length of the OFDM frame becomes larger than that of the current terrestrial digital broadcasting.

By the way, the OFDM frame is configured such that information of a physical layer is added in the physical layer into upper layer data of upper layers (an open systems interconnection (OSI) reference model data link layer, a network layer, a transport layer, a session layer, a presentation layer, and an application layer) higher than the physical layer.

Assuming that the information added in the physical layer is referred to as additional information, the additional information of the current terrestrial digital broadcasting includes transmission and multiplexing configuration and control (TMCC) signals and auxiliary channel (AC) signals.

A reception side cannot execute processing based on the TMCC signal unless the reception side acquires all of the TMCC signals included in the OFDM frame. This also applies to the AC signals.

Therefore, in the case where the FFT size is made large and the OFDM frame is configured by 204 OFDM symbols, similarly to the current terrestrial digital broadcasting, it takes time to receive the OFDM frame and execute the processing based on the TMCC signals and the AC signals when channel switching is performed. As a result, the time required for synchronization processing and the like is increased, and the time for the channel switching, that is, the time to output content after the channel switching is increased.

As a method of suppressing the increase in the time of the channel switching as described above, for example, a method of configuring the OFDM frame by the number of OFDM symbols smaller than that in the current terrestrial digital broadcasting to make the frame length be at the same level as that in the current terrestrial digital broadcasting is conceivable.

However, the additional information of the physical layer that can be included in the OFDM frame, that is, an information amount (bit depth) of the TMCC signals and the AC signals, for example, is proportional to the number of the OFDM symbols configuring the OFDM frame.

Therefore, if the number of the OFDM symbols constituting the OFDM frame is reduced, the information amount of the additional information that can be included in the OFDM frame becomes small, and sufficiently securing the information amount of the additional information of the physical layer to be included in the OFDM frame becomes difficult.

The present technology has been made in view of the foregoing, and can sufficiently secure an information amount of additional information of a physical layer.

Solutions to Problems

A transmission device according to the present technology is a transmission device including a generation unit configured to generate an orthogonal frequency division multiplexing (OFDM) signal in which additional information of a physical layer is allocated to additional carriers in each of groups, the groups being obtained by grouping the additional carriers to be used for transmission of the additional information, of carriers of the OFDM signal of one frame, into the groups of the number of groups according to a DFT size of when inverse discrete Fourier transform (IDFT) of the OFDM signal is performed, and a transmission unit configured to transmit the OFDM signal.

A transmission method according to the present technology is a transmission method including generating an orthogonal frequency division multiplexing (OFDM) signal in which additional information of a physical layer is allocated to additional carriers in each of groups, the groups being obtained by grouping the additional carriers to be used for transmission of the additional information, of carriers of the OFDM signal of one frame, into the groups of the number of groups according to a DFT size of when inverse discrete Fourier transform (IDFT) of the OFDM signal is performed, and transmitting the OFDM signal.

In the transmission device and the transmission method according to the present technology, an orthogonal frequency division multiplexing (OFDM) signal in which additional information of a physical layer is allocated to additional carriers in each of groups, the groups being obtained by grouping the additional carriers to be used for transmission of the additional information, of carriers of the OFDM signal of one frame, into the groups of the number of groups according to a DFT size of when inverse discrete Fourier transform (IDFT) of the OFDM signal is generated and transmitted.

A reception device according to the present technology is a reception device including a reception unit configured to receive an orthogonal frequency division multiplexing (OFDM) signal in which additional information of a physical layer is allocated to additional carriers in each of groups, the groups being obtained by grouping the additional carriers to be used for transmission of the additional information, of carriers of the OFDM signal of one frame, into the groups of the number of groups according to a DFT size of when inverse discrete Fourier transform (IDFT) of the OFDM signal is performed, and an acquisition unit configured to acquire the additional information corresponding to the number of groups according to the DFT size from the OFDM signal.

A reception method according to the present technology is a reception method including receiving an orthogonal frequency division multiplexing (OFDM) signal in which additional information of a physical layer is allocated to additional carriers in each of groups, the groups being obtained by grouping the additional carriers to be used for transmission of the additional information, of carriers of the OFDM signal of one frame, into the groups of the number of groups according to a DFT size of when inverse discrete Fourier transform (IDFT) of the OFDM signal is performed, and acquiring the additional information corresponding to the number of groups according to the DFT size from the OFDM signal.

In the reception device and the reception method according to the present technology, an orthogonal frequency division multiplexing (OFDM) signal in which additional information of a physical layer is allocated to additional carriers in each of groups, the groups being obtained by grouping the additional carriers to be used for transmission of the additional information, of carriers of the OFDM signal of one frame, into the groups of the number of groups according to a DFT size of when inverse discrete Fourier transform (IDFT) of the OFDM signal is performed is received, and the additional information corresponding to the number of groups according to the DFT size is acquired from the OFDM signal.

Note that the transmission device and the reception device may be independent devices or may be internal blocks configuring one device.

Furthermore, the transmission device and the reception device can be realized by causing a computer to execute a program. The program for realizing the transmission device and the reception device can be provided by being transmitted via a transmission medium or by being recorded on a recording medium.

Effects of the Invention

According to the present technology, an information amount of additional information of a physical layer can be sufficiently secured.

Note that the effects described here are not necessarily limited, and any of effects described in the present disclosure may be exhibited.

BRIEF DESCRIPTION OF DRAWINGS

FIG. 9 is a diagram illustrating examples of grouping patterns of additional carriers according to FFT sizes.

FIG. 14 is a diagram illustrating an example of FFT size signaling to be included in a frame synchronization symbol.

FIG. 15 is a block diagram illustrating a configuration example of an embodiment of a computer to which the present technology is applied.

MODE FOR CARRYING OUT THE INVENTION

Hereinafter, an embodiment of the present technology will be described. Before the description of an embodiment, an outline of an OFDM frame will be described as preparation in preliminary step.

<OFDM Frame>

Figure 1:
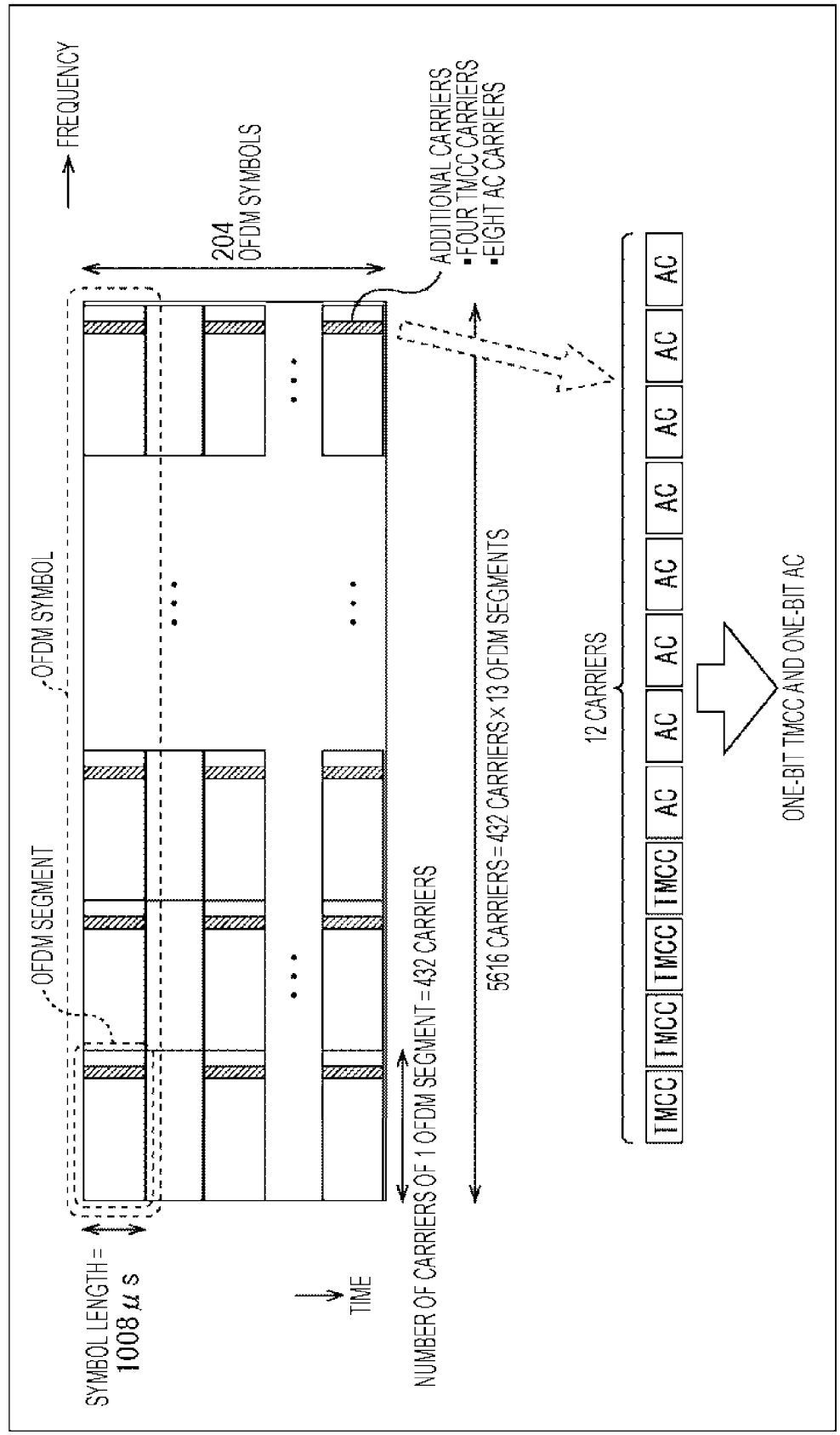
FIG. 1 is a diagram illustrating an outline of a configuration of an OFDM frame of mode 3 of ISDB-T.

FIG. 1 is a diagram illustrating an outline of a configuration of an OFDM frame of mode 3 of ISDB-T.

In FIG. 1, the horizontal axis represents frequency and the vertical axis represents time.

An OFDM frame is configured such that 204 OFDM symbols each having a symbol length of 1008 us (micro second) are arranged.

The OFDM symbol is configured by 13 portions extending in a frequency direction, the portions corresponding to 13 segments configuring one channel. In the present specification, for convenience of description, each of the 13 portions corresponding to the 13 segments configuring one channel of the OFDM symbol is referred to as an OFDM segment.

The OFDM segment includes 432 carriers (subcarriers).

Therefore, the OFDM symbol includes 5616 carriers=432 carriers×13 segments.

Note that, in ISDB-T, a pilot (continual pilot (CP)) carrier for reception synchronization is transmitted in a high band of the channel. Therefore, the total number of carriers of an OFDM signal transmitted on one channel is 5617 carriers=5616 carriers+1 carrier.

In ISDB-T, as carrier modulation methods by upper layer data, four modulation methods including quaternary phase shift keying (QPSK), quadrature amplitude modulation (16 QAM), and 64 QAM, as synchronous modulation, and differential QPSK (DQPSK) as differential modulation are defined.

In a case where the synchronous modulation is adopted, 384 carriers out of the 432 carriers of the OFDM segment are used for transmission of upper layer data, and 36 carriers out of the 432 carriers are used for transmission of a pilot signal (scattered pilot (SP)). Furthermore, 4 carriers are used for transmission of TMCC signal as additional information of a physical layer, and 8 carriers are used for transmission of AC signal as additional information of the physical layer.

Hereinafter, the carrier used for transmission of upper layer data is also referred to as a data carrier, and the carrier used for transmission of additional information of the physical layer, such as the TMCC signal or the AC signal is referred to as an additional carrier.

Here, in Non-Patent Document 1, the TMCC signal is defined as control information for assisting demodulation and the like, and the AC signal is defined as additional information regarding broadcasting. However, since both (the additional carriers) of the TMCC signal and the AC signal are information of the physical layer to be added to the data carriers, the TMCC signal and the AC signal are referred to as additional information in the present specification. Any information of the physical layer to be added to the data carriers can be included in the additional information, in addition to the TMCC signal and the AC signal.

The OFDM segment includes a total of 12 additional carriers: 4 additional carriers (TMCC carriers) used for transmission of the TMCC signal; and 8 additional carriers (AC carriers) used for transmission of the AC signal.

The additional carriers are modulated by BPSK (DBPSK) according to the TMCC signal and the AC signal.

Therefore, the TMCC signal and the AC signal transmitted by one additional carrier are one bit.

Furthermore, the same TMCC signal is transmitted in the 4 TMCC carriers out of the 12 additional carriers of the OFDM segment. In other words, the 4 TMCC carriers of the OFDM segment are modulated with the same one bit of the TMCC signal. Therefore, the TMCC signal transmitted by the 4 TMCC carriers of the OFDM segment is one bit.

Similarly, the same AC signal is transmitted in the 8 AC carriers out of the 12 additional carriers of the OFDM segment. Therefore, the AC signal transmitted by the 8 AC carriers of the OFDM segment is also one bit.

In ISDB-T, hierarchical transmission is defined, and OFDM segments to which different types of transmission path coding have been applied can be simultaneously transmitted.

In the present specification, for simplicity of description, assuming that transmission of one layer with 13 OFDM segments is performed, the same TMCC signal and the same AC signal are transmitted with the 13 OFDM segments in the one layer in ISDB-T.

Therefore, both the TMCC signal transmitted by 4×13 TMCC carriers of the 13 OFDM segments configuring one OFDM symbol and the AC signal transmitted by 8×13 AC carriers are one bit.

As described above, the one bit of the TMCC signal is transmitted by the 4×13 TMCC carriers of the 13 OFDM segments configuring one OFDM symbol. Similarly, the one bit of the AC signal is transmitted by the 8×13 AC carriers of the 13 OFDM segments configuring one OFDM symbol.

Therefore, since the TMCC signal and the AC signal are transmitted with high redundancy, even if one of the additional carriers (the TMCC carriers and the AC carriers) collapses due to multipath fading or the like, for example, the reception side can restore the TMCC signal or the AC signal, using other additional carriers, and transmission with high robustness can be performed.

Note that, in ISDB-T, different bits of the TMCC signal are transmitted in different OFDM symbols. Therefore, the information amount of the TMCC signal that can be transmitted in the OFDM frame is 204 bits equal to the number of 204 OFDM symbols configuring the OFDM frame. This similarly applies to the AC signal.

Figure 2:
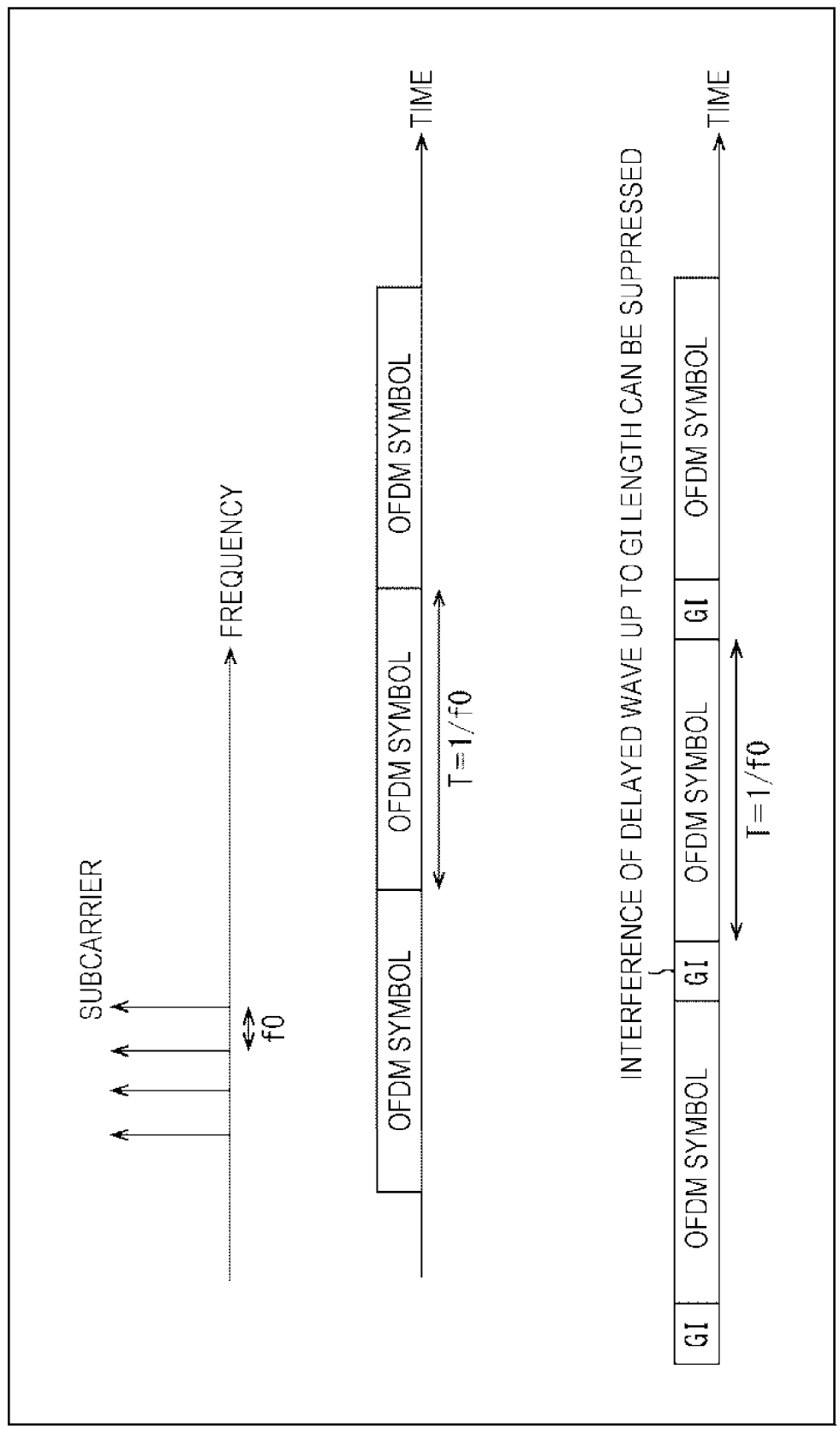
FIG. 2 is a diagram for describing parameters of OFDM symbols configuring an OFDM frame.

FIG. 2 is a diagram for describing parameters of the OFDM symbols configuring the OFDM frame.

A symbol length T of the OFDM symbol is equal to a reciprocal of a carrier interval f0 of the carriers included in the OFDM symbol.

Therefore, when the carrier interval f0 is made small and the number of carriers of the OFDM symbol, and thus the FFT size of the OFDM symbol is made large, the symbol length T becomes large.

In ISDB-T, a copy of a part of the rear portion of the OFDM symbol is added as a guard interval (GI) to a head of the OFDM symbol, and a resultant OFDM signal is transmitted. With the addition of the GI, an interference with a delayed wave having a delay time up to a length (GI length) of the GI can be suppressed.

By the way, in advanced terrestrial digital broadcasting that is next-generation terrestrial digital broadcasting of the current terrestrial digital broadcasting, in a case where a narrower carrier interval than the carrier interval of the current terrestrial digital broadcasting is adopted and an FFT size larger than 8K points of the current terrestrial digital broadcasting, for example, 16K points, 32K points, or the like, is adopted, the symbol length of the OFDM symbol becomes large, as described in FIG. 2.

Then, assuming that the OFDM frame is configured by 204 OFDM symbols, similarly to the current terrestrial digital broadcasting, for example, the symbol length becomes large and as a result, the frame length of the OFDM frame becomes larger than that of the current terrestrial digital broadcasting.

Here, an OFDM frame adopting the FFT size such as 16K points or 32K points, for example, larger than the 8K points of the current terrestrial digital broadcasting is also called new OFDM frame. Furthermore, an OFDM frame adopting the FFT size of 8K points of the current terrestrial digital broadcasting (mode 3) is also called current OFDM frame.

As for the new OFDM frame, the GI with the same GI length as the case of the current OFDM frame is added, whereby the interference with a delayed wave up to the same delay time as the case of the current OFDM frame can be suppressed.

Furthermore, since the new OFDM frame has a longer symbol length than the current OFDM frame, the GI length becomes relatively shorter than the symbol length. Therefore, according to the new OFDM frame, the transmission efficiency can be improved compared with the current OFDM frame.

Note that, since the new OFDM frame has the longer symbol length than the current OFDM frame, the frame length becomes long in a case where the new OFDM frame is configured by 204 OFDM symbols similar to the current terrestrial digital broadcasting.

Now, for simplicity of description, assuming that (the additional carriers of) the additional information similar to those of the current OFDM frame is included in the new OFDM frame, the new OFDM frame having the longer frame length requires longer time to acquire the TMCC signals and the AC signals of the one frame and execute processing based on the TMCC signals and the AC signals than the case of the current OFDM frame.

As a result, in a case where channel switching is performed, time required for the channel switching, in other words, time to output content after the channel switching is increased.

As a method of suppressing the increase in the time of the channel switching as described above, for example, a method of configuring the OFDM frame by the number of OFDM symbols smaller than that in the current terrestrial digital broadcasting is conceivable.

However, the additional information of the physical layer that can be included in the OFDM frame, that is, an information amount (bit depth) of the TMCC signals and the AC signals, for example, is proportional to the number of the OFDM symbols configuring the OFDM frame.

Therefore, if the number of the OFDM symbols constituting the OFDM frame is reduced, the information amount of the additional information that can be included in the OFDM frame becomes small, and sufficiently securing the information amount of the additional information of the physical layer to be included in the OFDM frame becomes difficult.

By the way, as described in FIG. 1, in the current OFDM frame, the high redundancy is imparted to the additional information such as the TMCC signal and the AC signal, whereby transmission with high robustness is performed.

In the present technology, the information amount of the additional information that can be included in the new OFDM frame is sufficiently secured by sacrificing the robustness to some extent.

<Embodiment of Transmission System to Which Present Technology is Applied>

Figure 3:
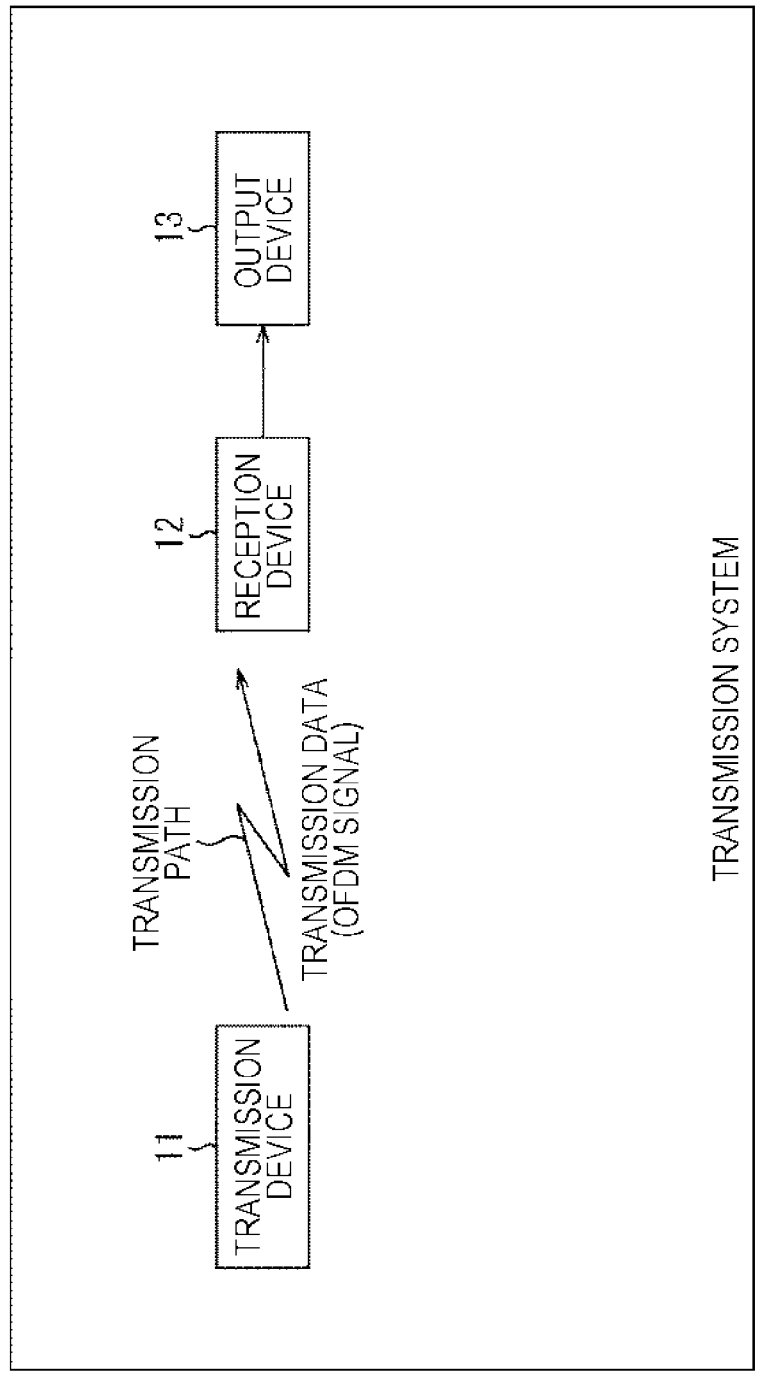
FIG. 3 is a block diagram illustrating a configuration example of an embodiment of a transmission system to which the present technology is applied.

FIG. 3 is a block diagram illustrating a configuration example of an embodiment of a transmission system (a system is a group of a plurality of logically gathered devices, and whether or not the devices of configurations are in the same casing is irrelevant) to which the present technology is applied.

In FIG. 3, the transmission system includes a transmission device 11, a reception device 12, and an output device 13.

The transmission device 11 performs transmission (broadcasting) of, for example, a television broadcast program or the like. In other words, the transmission device 11 performs, for example, transmission processing necessary for content of the program such as image data and audio data, as target data that is an object for transmission. The transmission device 11 transmits transmission data obtained by applying the transmission processing to the target data, via a transmission path such as a satellite line, a terrestrial wave, or a cable (wired line), for example.

The transmission data transmitted by the transmission device 11 includes the pilot signal and the additional information of the physical layer, in addition to the content of the programs.

The reception device 12 receives the transmission data transmitted from the transmission device 11 via the transmission path, restores the content of the program included in the transmission data, and supplies the restored content to the output device 13.

The output device 13 includes a display for displaying an image and a speaker for outputting audio (sound), and displays an image and outputs audio as the content and the like from the reception device 12.

<Configuration Example of Transmission Device 11>

Figure 4:
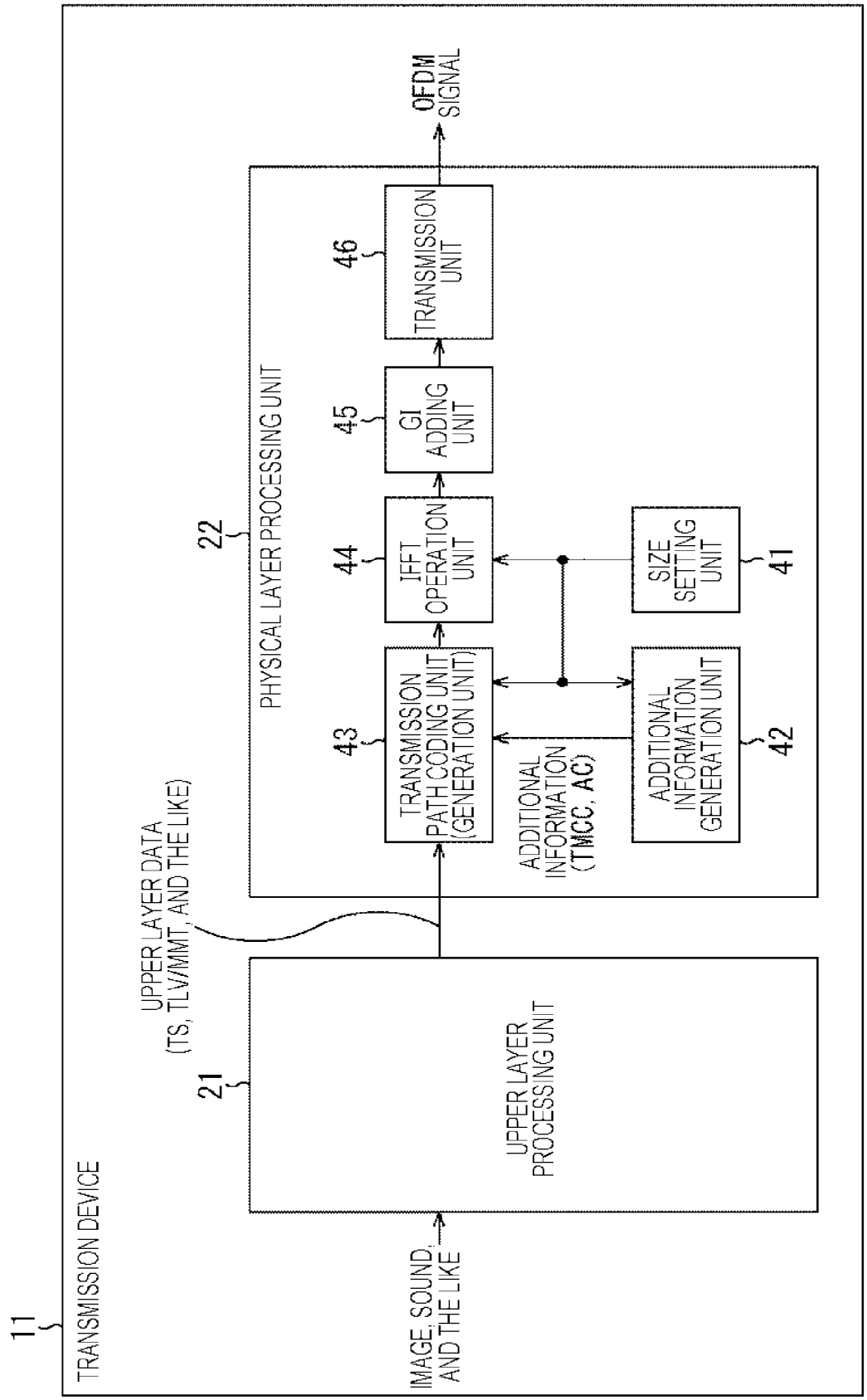
FIG. 4 is a block diagram illustrating a configuration example of a transmission device 11.

FIG. 4 is a block diagram illustrating a configuration example of a transmission device 11 in FIG. 3.

In FIG. 4, the transmission device 11 is, for example, a transmission device using a transmission method of ISDB-T, and includes an upper layer processing unit 21 and a physical layer processing unit 22.

The image, audio, and the like of the content of the program are supplied to the upper layer processing unit 21.

The upper layer processing unit 21 performs upper layer processing of generating upper layer data in a format defined in an upper layer from the image, audio, and the like of the content of the program, and supplies the upper layer data to the physical layer processing unit 22.

In other words, for example, the upper layer processing unit 21 encodes the image, audio, and the like of the content of the program as the upper layer processing, generates the upper layer data including coded images, audio, and the like, and supplies the upper layer data to the physical layer processing unit 22.

As the upper layer data, for example, a stream such as a transport stream (TS) or a type length value (TLV)/MPEG media transport (MMT) can be adopted.

The physical layer processing unit 22 applies physical layer processing to the upper layer data from the upper layer processing unit 21, and transmits, for example, an OFDM signal as resultant transmission data.

In other words, the physical layer processing unit 22 includes a size setting unit 41, an additional information generation unit 42, a transmission path coding unit 43, an inverse fast Fourier transform (IFFT) operation unit 44, a guard interval (GI) adding unit 45, and a transmission unit 46.

The size setting unit 41 sets the FFT size for performing IFFT of the OFDM signal by selecting the FFT size from among a plurality of predetermined FFT sizes according to operation of an operator of the transmission device 11 or the like, for example, and supplies the selected FFT size to the additional information generation unit 42, the transmission path coding unit 43, and the IFFT operation unit 44.

The additional information generation unit 42 generates the additional information that is physical layer data (data of the physical layer) and supplies the generated additional information to the transmission path coding unit 43. For example, in ISDB-T, the TMCC signal and the AC signal are the additional information that is the physical layer data.

Here, the additional information is included in the OFDM frame obtained by the transmission path coding unit 43. The information amount of the additional information that can be included in one OFDM frame (hereinafter also referred to as an allowable information amount) is determined according to the FFT size or the like. Therefore, the additional information generation unit 42 obtains the allowable information amount using the FFT size supplied from the size setting unit 41, and generates the additional information of the information amount within the range of the allowable information amount.

To the transmission path coding unit 43, the FFT size is supplied from the size setting unit 41 and the additional information is supplied from the additional information generation unit 42, and in addition, the upper layer data is supplied from the upper layer processing unit 21.

The transmission path coding unit 43 applies predetermined transmission path coding to the upper layer data from the upper layer processing unit 21 to generate an OFDM frame to which the additional information from the additional information generation unit 42 is added and the physical layer data such as a necessary pilot signal is further added.

Therefore, the transmission path coding unit 43 functions as a generation unit that generates an OFDM frame.

Here, for example, in transmission path coding in ISDB-T, for example, error correction coding of the upper layer data, mapping as modulation of the data carriers according to the upper layer data (mapping of the upper layer data onto IQ constellation), frequency interleaving, time interleaving, and the like are performed.

In the transmission path coding by the transmission path coding unit 43, processing similar to the transmission line coding of the ISDB-T is performed, for example. Moreover, the transmission path coding unit 43 adds the additional carriers corresponding to the additional information (carriers modulated according to the additional information), the carrier corresponding to the pilot signal (the carrier modulated according to the pilot signal), and the like to the data carriers corresponding to the upper layer data (carriers modulated according to the upper layer data) obtained by the transmission path coding, thereby to configure an OFDM segment.

Moreover, the transmission path coding unit 43 configures one OFDM symbol by Nseg OFDM segments, and configures an OFDM signal of one frame, in other words, one OFDM frame by the number of OFDM symbols according to the FFT size from the size setting unit 41. Nseg represents the number of segments of the OFDM segments configuring the OFDM symbol. In ISDB-T, the number of segments Nseg is 13.

Here, the number of additional carriers configuring the OFDM segment is predetermined to a fixed number. Note that the transmission path coding unit 43 groups the fixed number of the additional carriers into the number of groups according to the FFT size from the size setting unit 41, and allocates the additional information to the additional carriers in each of the groups. The additional carrier is modulated according to the additional information allocated to the additional carrier.

In other words, in the transmission system in FIG. 3, a grouping pattern (a pattern of grouping) of the additional carriers according to the FFT size is determined in advance with respect to each FFT size set by the size setting unit 41, for example.

For example, assume that the number of additional carriers configuring an OFDM segment is 12, similarly to the case of the mode 3 of ISDB-T described in FIG. 1.

In this case, the transmission path coding unit 43 groups the 12 additional carriers into groups of the number of groups according to the FFT size set by the size setting unit 41.

Now, for example, assuming that the grouping pattern of the additional carriers with respect to the FFT size set by the size setting unit 41 is determined such that the 12 carriers are grouped into 4 groups each including 3 additional carriers, the transmission path coding unit 43 groups the 12 additional carriers into 4 groups each including 3 additional carriers.

As an additional carrier modulation method, in a case where a signal point on the IQ constellation adopts 2 BPSKs (DBPSKs), similarly to ISDB-T, for example, one bit can be transmitted by one additional carrier. Furthermore, as an additional carrier modulation method, in a case where a signal point on the IQ constellation adopts $2^2$ QPSKs or the like, for example, two bits can be transmitted by one additional carrier.

In the present embodiment, for simplicity of description, a signal point on the IQ constellation adopts 2 BPSKs, similar to ISDB-T, for example, as the additional carrier modulation method. In this case, the transmission path coding unit 43 allocates 1-bit additional information transmittable by one additional carrier to the one additional carrier.

Note that the transmission path coding unit 43 allocates the same additional information to the additional carriers in the same group.

Therefore, for example, in the case where the 12 additional carriers included in the OFDM segment are grouped into the 4 groups each including 3 additional carriers, as described above, 3-bit additional information of the same number as the number of groups is transmitted in the OFDM segment.

Now, assuming that the number of segments of the OFDM segments configuring the OFDM symbol is denoted by Nseg, as described above, and the same additional information is transmitted in the Nseg OFDM segments configuring the OFDM symbol, similarly to the case of FIG. 1. Moreover, the number of OFDM symbols constituting the OFDM frame is denoted by Nsym. Furthermore, the additional carriers included in the OFDM segment are grouped into Ng groups.

In this case, the allowable information amount, which is the information amount of the additional information that can be included in one OFDM frame, is Nseg×Nsym×Ng bits.

In the transmission system, since the number of groups (the number of groups) Ng is determined according to the FFT size, Nseg×Nsym×Ng bits as the allowable information amount can be determined according to the FFT size.

As described above, since the transmission path coding unit 43 allocates the same additional information to the additional carriers in the same group, the redundancy becomes larger as the number of the additional carriers configuring the group is larger and the robustness of the additional information to be allocated to the additional carriers can be improved.

Furthermore, since the allowable information amount is Nseg×Nsym×Ng bits, the information amount of the additional information transmittable by one OFDM frame can be improved as the number of groups Ng is larger.

As described above, the transmission path coding unit 43 generates the OFDM frame as the OFDM signal in which the additional information is allocated to the additional carriers in each of groups, the groups being obtained by grouping the additional carriers of the OFDM segment into the groups of the number of groups Ng according to the FFT size, and supplies the OFDM frame to the IFFT operation unit 44.

The IFFT operation unit 44 performs IFFT with the FFT size from the size setting unit 41, for the OFDM frame supplied from the transmission path coding unit 43 as a signal in a frequency domain to convert the OFDM frame into an OFDM frame in a time domain, and supplies the converted OFDM frame to the GI adding unit 45.

The GI adding unit 45 adds a GI having a length corresponding to 1/(integer) of the symbol length of each of the OFDM symbols configuring the OFDM frame in the time domain from the IFFT operation unit 44 to the OFDM symbol to configure the OFDM signal as the transmission data, and supplies the OFDM signal to the transmission unit 46.

The transmission unit 46 performs frequency conversion for the transmission data from the GI adding unit 45, and transmits an OFDM signal as transmission data after the frequency conversion.

Figure 5:
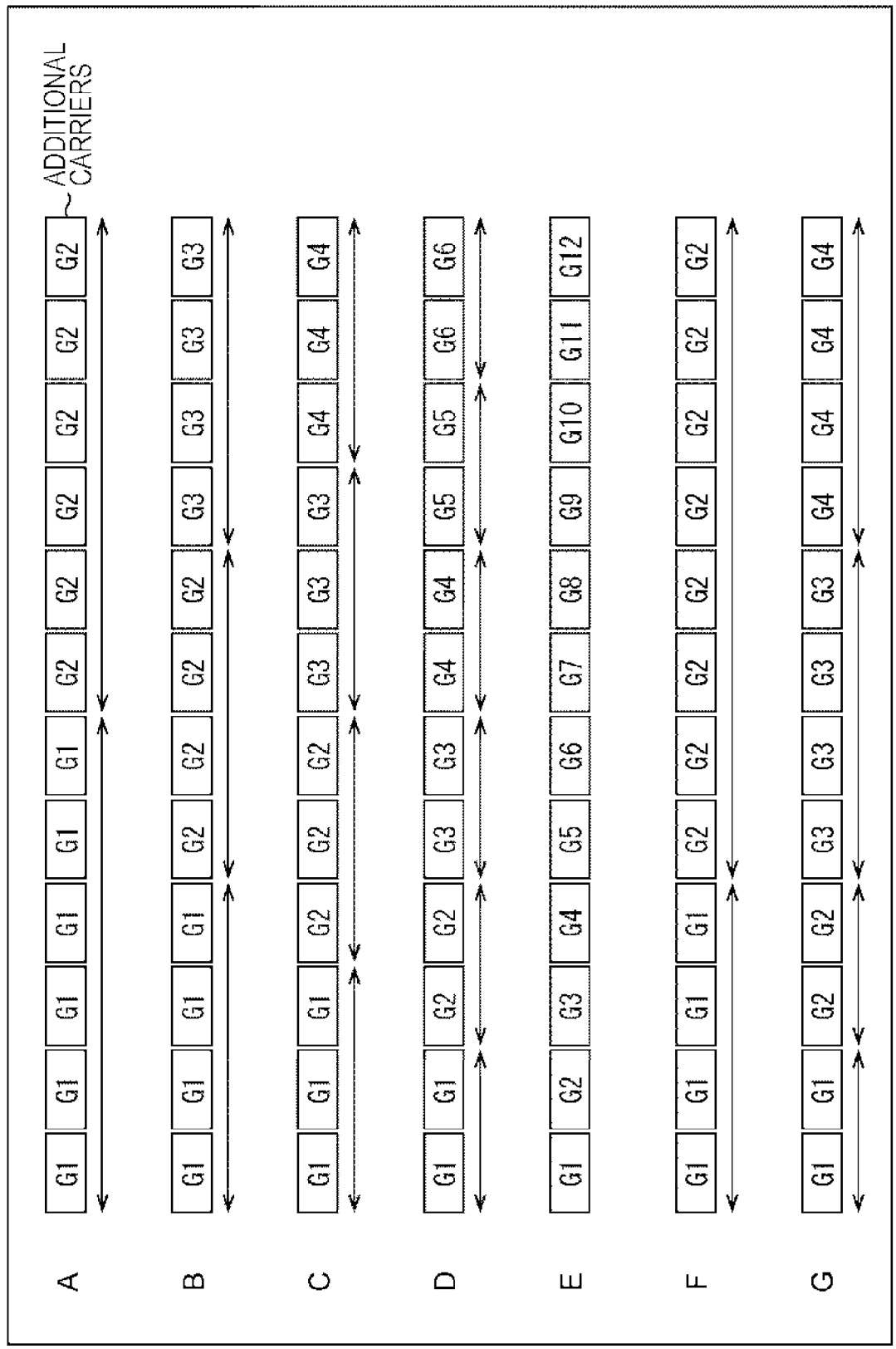
FIG. 5 is a diagram illustrating examples of grouping patterns of grouping additional carriers included in an OFDM segment, which is performed in a transmission path coding unit 43.

FIG. 5 is a diagram illustrating examples of grouping patterns of grouping the additional carriers included in the OFDM segment, which is performed by the transmission path coding unit 43 in FIG. 4.

FIG. 5 illustrates examples of grouping patterns of 12 additional carriers.

A in FIG. 5 illustrates a grouping pattern of grouping the 12 additional carriers into 2 groups G1 and G2 each having 6 additional carriers as members.

B in FIG. 5 illustrates a grouping pattern of grouping the 12 additional carriers into 3 groups G1, G2, and G3 each having 4 additional carriers as members.

C in FIG. 5 illustrates a grouping pattern of grouping the 12 additional carriers into 4 groups G1, G2, G3, and G4 each having 3 additional carriers as members.

D in FIG. 5 illustrates a grouping pattern of grouping the 12 additional carriers into 6 groups G1, G2, G3, G4, G5, and G6 each having 2 additional carriers as members.

E in FIG. 5 illustrates a grouping pattern of grouping the 12 additional carriers into 12 groups G1, G2, G3, G4, G5, G6, G7, G8, G9, G10, G11, and G12 each having one additional carrier as a member.

In A to E in FIG. 5, the number of the additional carriers to be the members of the group is the same regardless of the group, but the number of the additional carriers to be the members of the group may be different for each group.

F and G in FIG. 5 illustrate examples of grouping patterns in which the number of the additional carriers to be the members is different for each group.

That is, F in FIG. 5 illustrates a grouping pattern of grouping the 12 additional carriers into a group G1 having 4 additional carriers as members and a group G2 having 8 additional carriers as members.

G in FIG. 5 illustrates a grouping pattern of grouping the 12 additional carriers into two groups G1 and G2 each having 2 additional carriers as members and two groups G3 and G4 each having 4 additional carriers as members.

As described with reference to FIG. 4, the transmission path coding unit 43 groups the 12 additional carriers of the OFDM segment into the number of groups according to the FFT size set by the size setting unit 41 according to the grouping pattern determined in advance.

Then, the transmission path coding unit 43 allocates the same additional information to the additional carriers in the same group.

Therefore, by adopting the grouping pattern having a large number of groups, the information amount of the additional information transmittable by the additional carriers can be made large.

Note that, since the number of the additional carriers of the OFDM segment is a fixed number, the number of the additional carriers to be the members of the group becomes small in a case of adopting the grouping pattern having a large number of groups. As a result, the redundancy of the additional information transmitted by the additional carriers is reduced, and the robustness is lowered.

As described above, in the case of adopting the grouping pattern having a large number of groups, the information amount of the additional information transmittable by the additional carriers can be secured, sacrificing the robustness.

Here, in the transmission device 11, an OFDM frame configured by the number of symbols Nsym that makes the frame length of the OFDM frame be a predetermined value can be adopted, for example.

For example, in the advanced terrestrial digital broadcasting, change of the number of segments Nseg of the channel from the 13 segments of the current terrestrial digital broadcasting to 35 segments has been examined.

In the advanced terrestrial digital broadcasting, assuming that 432 is adopted as the number of carriers included in one OFDM segment, similarly to the current terrestrial digital broadcasting (ISDB-T) described in FIG. 1, for example, the number of carriers of the OFDM symbol becomes 15120 carriers=432 carriers×35 segments in the case where the number of segments Nseg is 35 segments. Furthermore, the number of carriers of the OFDM signal of one channel becomes 15121 carriers including the pilot carrier for reception synchronization.

Moreover, in the advanced terrestrial digital broadcasting, assuming that 12 is adopted as the number of additional carriers included in one OFDM segment, similarly to the current terrestrial digital broadcasting described in FIG. 1, for example, the number of additional carriers of the OFDM symbol becomes 420 carriers=12 carriers×35 segments.

Assuming that the same additional information is transmitted in each of the 35 OFDM segments configuring the OFDM symbol, similarly to the case in FIG. 1, the additional information is transmitted at a redundancy of about 2.7 times ($\approx$420 carriers/(12 carriers×13 segments)) of the current terrestrial digital broadcasting in the advanced terrestrial digital broadcasting.

By the way, in the advanced terrestrial digital broadcasting, in a case where the number of carriers of the OFDM signal of one channel is 15121 carriers, as described above, the FFT size becomes 16K points, 32K points, or the like, which is larger than the number of carriers.

Now, in the advanced terrestrial digital broadcasting, assuming that 16K points, which are twice the 8K points of the current terrestrial digital broadcasting, is adopted as the FFT size, for example, and an interval of ½ times the carrier interval of the mode 3 of the current terrestrial digital broadcasting is adopted as the carrier interval, accordingly.

In other words, in the current terrestrial digital broadcasting, for example, the carrier interval is halved and the FFT size is doubled each time the mode is increased by 1. For example, in mode 2, the carrier interval becomes 1/2 times the carrier interval in mode 1, and the FFT size becomes 4K points that are twice the 2K points that are the FFT size in the mode 1. Furthermore, for example, in the mode 3, the carrier interval becomes 1/2 times the carrier interval in the mode 2, and the FFT size becomes 8K points that are twice the 4K points that are the FFT size in the mode 2.

In the advanced terrestrial digital broadcasting, in the case where 16K points are adopted as the FFT size, this FFT size is twice the 8K points that are the FFT size in the mode 3 of the current terrestrial digital broadcasting. Therefore, the interval of ½ times the carrier interval in the mode 3 of the current terrestrial digital broadcasting is adopted as the carrier interval with the adoption of the 16K points as the FFT size, following the current terrestrial digital broadcasting, for example.

In the case of adopting, as the carrier interval, the interval of ½ times the carrier interval in the mode 3 of the current terrestrial digital broadcasting, the symbol length becomes twice the symbol length in the mode 3 of the current terrestrial digital broadcasting.

Therefore, in the advanced terrestrial digital broadcasting, assuming that the OFDM frame is configured by 204 OFDM symbols similarly to the case of the current terrestrial digital broadcasting, the frame length of the OFDM frame is twice the frame length in the mode 3 of the current terrestrial digital broadcasting.

In this case, roughly, the time required for channel switching becomes twice the time in the case of the current terrestrial digital broadcasting.

In the advanced terrestrial digital broadcasting, to set the time required for channel switching to be at the same level as the time required in the case of the current terrestrial digital broadcasting, the frame length of the new OFDM frame that is the OFDM frame of the advanced terrestrial digital broadcasting needs to be made at the same level as the frame length of the current OFDM frame that is the OFDM frame of the current terrestrial digital broadcasting.

In this case, to make the frame length of the new OFDM frame be at the same level as the frame length of the current OFDM frame, the number of OFDM symbols configuring the new OFDM frame needs to be reduced to about ½ of that of the current OFDM frame.

As the OFDM frame generated by the transmission device 11, in other words, for example, as the new OFDM symbol of the advanced terrestrial digital broadcasting, an OFDM frame configured by the number of symbols Nsym that makes the frame length of the OFDM frame be the OFDM frame of the current OFDM frame (or a value close to the frame length of the current OFDM frame) can be adopted, for example.

In this case, in the transmission device 11, an OFDM frame configured by the OFDM symbols of 102 symbols=204 symbols/2 is generated.

By the way, as described in FIG. 1 and the like, the information amount of the TMCC signals as the additional information transmittable by the current OFDM frame is 204 bits, which is the same as the number of 204 OFDM symbols configuring the OFDM frame. This similarly applies to the AC signal.

Meanwhile, when the number of symbols of the OFDM symbols configuring the new OFDM frame generated in the transmission device 11 is set to ½ times of the case of the current OFDM frame, the information amount of the additional information transmittable by the new OFDM frame becomes 102 bits, which are 1/2 times the 204 bits of the case of the current OFDM frame.

In other words, in a case of transmitting the TMCC signals and the AC signals as the additional information by the new OFDM frame configured by the OFDM symbols of the number of symbols that is ½ times the number of symbols of the current OFDM frame, similarly to the current OFDM frame, the TMCC signals and the AC signals as the additional information transmittable by the new OFDM frame is decreased from 204 bits to 102 bits.

Therefore, the transmission path coding unit 43 groups the 12 additional carriers into 4 groups G1, G2, G3, and G4 each having 3 additional carriers as members, as illustrated in C in FIG. 5, for example, according to 16K points that are the FFT size of the new OFDM frame.

In this case, the additional information transmittable by the OFDM segment is 4 bits equal to the number of groups, and according to the new OFDM frame including 102 OFDM symbols configured by such OFDM segments, the additional information of 408 bits=4 bits×102 symbols can be transmitted.

In the current OFDM frame, a total of 408 bits of the additional information of the 204-bit TMCC signals and the 204-bit AC signals can be transmitted.

Therefore, according to the new OFDM frame in which the 12 carriers are grouped into the 4 groups G1, G2, G3, and G4 each having 3 additional carriers as members, the additional information of the same information amount as that of the current OFDM frame can be transmitted.

In other words, the information amount of the additional information can be sufficiently secured.

Note that, according to the new OFDM frame, the additional information of a larger information amount than that of the current OFDM frame can be transmitted by grouping the additional carriers into the number of groups, which is larger than 4.

In the transmission path coding unit 43, what kind of grouping is adopted as the grouping pattern of the additional carriers according to the FFT size is determined on the basis of, for example, a required frame length Tf required as the frame length of the new OFDM frame, a required information amount Nb required as the information amount of the additional information to be transmitted by the new OFDM frame, and a symbol length Tsym of the OFDM symbol including the carriers at carrier intervals with respect to the FFT size.

In other words, the number of symbols Nsym of the OFDM symbols configuring the new OFDM frame that satisfies the required frame length Tf is obtained from the required frame length Tf and the symbol length Tsym, and the grouping of obtaining the number of groups Ng by which Nsym×Ng becomes the required information amount Nb or more can be adopted as the grouping pattern of the additional carriers according to the FFT size.

According to such a grouping pattern, the additional information of the information amount that satisfies the required information amount Nb can be transmitted by the new OFDM frame that satisfies the required frame length Tf according to the FFT size.

Figure 6:
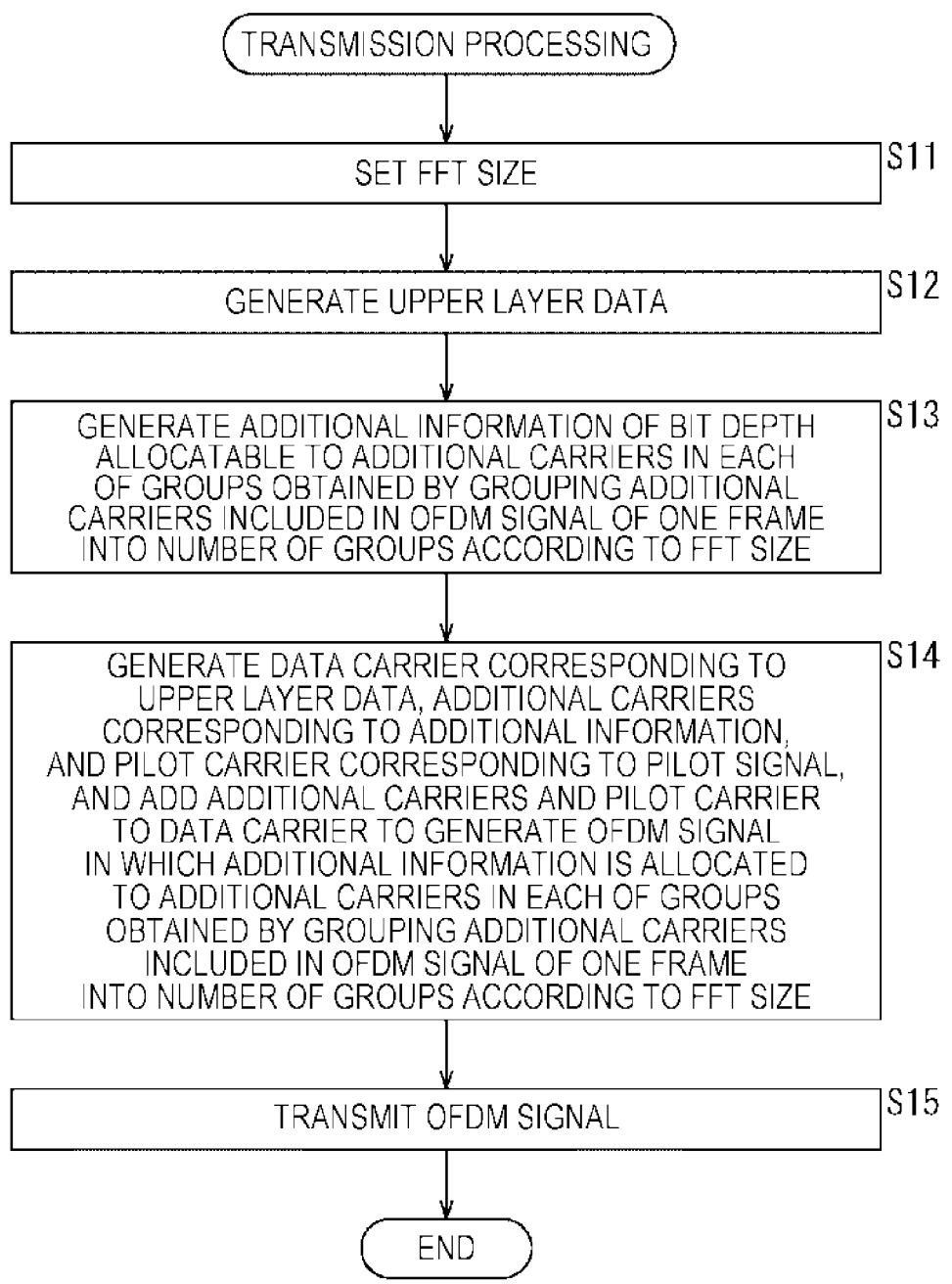
FIG. 6 is a flowchart for describing transmission processing performed by the transmission device 11.

FIG. 6 is a flowchart for describing transmission processing performed by the transmission device 11 in FIG. 4.

In the transmission processing, the OFDM signal as the transmission data is generated and transmitted.

Specifically, in step S11, the size setting unit 41 sets the FFT size and supplies the FFT size to the additional information generation unit 42, the transmission path coding unit 43, and the IFFT operation unit 44, and the processing proceeds to step S12.

In step S12, the upper layer processing unit 21 generates the upper layer data and supplies the upper layer data to the physical layer processing unit 22, and the processing proceeds to step S13.

In step S13, the additional information generation unit 42 of the physical layer processing unit 22 generates the additional information of the information amount corresponding to the FFT size from the size setting unit 41 and supplies the additional information to the transmission path coding unit 43, and the processing proceeds to step S14.

In other words, the additional information generation unit 42 generates the additional information of the bit depth allocatable to the additional carriers in each of groups, the groups being obtained by grouping the additional carriers included in the OFDM signal (OFDM frame) of one frame into the groups of the number of groups according to the FFT size from the size setting unit 41.

More specifically, in a case where the additional carriers included in the OFDM segment are grouped into Ng groups according to the FFT size from the size setting unit 41, and the OFDM frame is configured by Nsym (symbols) OFDM symbols, the additional information generation unit 42 generates, for example, the additional information of Ng×Nsym bits (or less) as the additional information of the information amount according to the FFT size from the size setting unit 41. Then, the additional information generation unit 42 supplies the additional information of Ng×Nsym bits to the transmission path coding unit 43 as the additional information to be included in the OFDM frame.

In step S14, the physical layer processing unit 22 adds the additional information generated by the additional information generation unit 42 to the upper layer data from the upper layer processing unit 21 to generate the OFDM signal as the transmission data.

In other words, in the physical layer processing unit 22, the transmission path coding unit 43 applies the transmission path coding to the upper layer data from the upper layer processing unit 21. The data carriers corresponding to the upper layer data (data carriers modulated with the upper layer data) are obtained by the transmission path coding.

Furthermore, the transmission path coding unit 43 generates the additional carriers corresponding to the additional information from the additional information generation unit 42 (additional carriers modulated with the additional information), and generates the pilot carrier corresponding to the pilot signal (pilot carrier modulated with the pilot signal).

Moreover, the transmission path coding unit 43 adds the additional carriers and the pilot carrier to the data carriers, thereby to generate the OFDM frame in which the additional information is allocated to the additional carriers in each of groups, the groups being obtained by grouping the additional carriers included in the OFDM frame into the groups of the number of groups according to the FFT size from the size setting unit 41. The OFDM frame is supplied from the transmission path coding unit 43 to the IFFT operation unit 44.

The IFFT operation unit 44 performs IFFT with the FFT size from the size setting unit 41, for the OFDM frame from the transmission path coding unit 43, and supplies a resultant OFDM frame in the time domain to the GI adding unit 45.

The GI adding unit 45 adds a GI to each of the OFDM symbols configuring the OFDM frame in the time domain from the IFFT operation unit 44 to configure the OFDM signal as the transmission data.

The GI adding unit 45 supplies the OFDM signal as the transmission data to the transmission unit 46, and the processing proceeds from step S14 to step S15.

In step S15, the transmission unit 46 performs frequency conversion for the transmission data from the GI adding unit 45, and transmits the OFDM signal as the transmission data after the frequency conversion.

In the transmission device 11, the processing in steps S12 to S15 is repeatedly performed in a pipeline.

<Configuration Example of Reception Device 12

Figure 7:
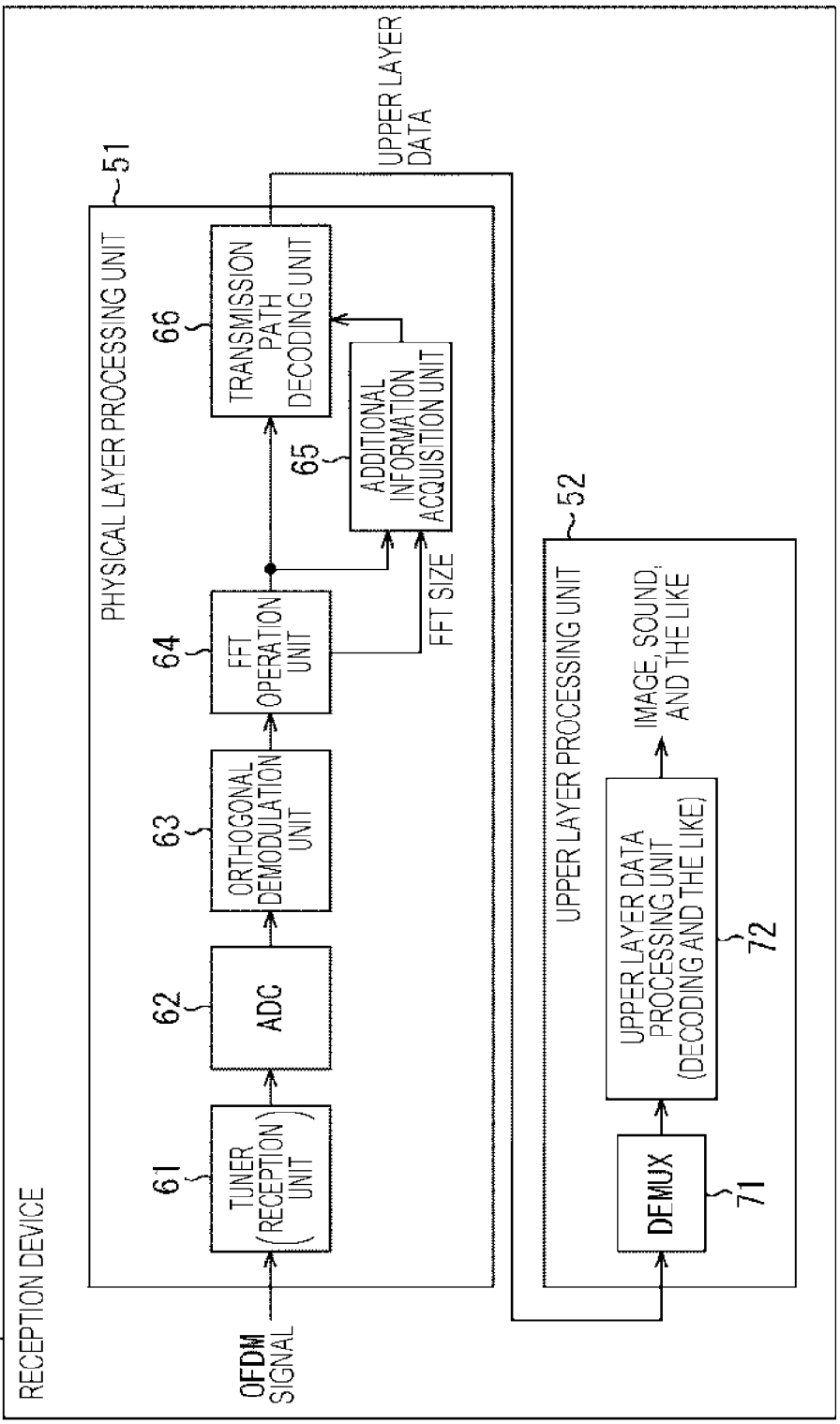
FIG. 7 is a block diagram illustrating a configuration example of a reception device 12.

FIG. 7 is a block diagram illustrating a configuration example of the reception device 12 in FIG. 3.

In FIG. 7, the reception device 12 is, for example, a reception device using a transmission method of ISDB-T, and includes a physical layer processing unit 51 and an upper layer processing unit 52.

The physical layer processing unit 51 receives the OFDM signal as the transmission data transmitted from the transmission device 11, and performs physical layer processing for the transmission data.

In other words, the physical layer processing unit 51 includes a tuner 61, an analog to digital converter (ADC) 62, an orthogonal demodulation unit 63, an FFT operation unit 64, an additional information acquisition unit 65, and a transmission path decoding unit 66.

The tuner 61 functions as a reception unit that receives the OFDM signal as the transmission data of a predetermined channel (frequency band) transmitted from the transmission device 11 and supplies the OFDM signal to the ADC 62.

The ADC 62 performs AD conversion for the OFDM signal as the transmission data from the tuner 61, and supplies the OFDM signal to the orthogonal demodulation unit 63.

The orthogonal demodulation unit 63 performs orthogonal demodulation for the OFDM signal as the transmission data from the ADC 62, and supplies the resultant OFDM signal in the time domain to the FFT operation unit 64.

The FFT operation unit 64 performs FFT for the OFDM signal in the time domain from the orthogonal demodulation unit 63, and supplies the resultant OFDM signal in the frequency domain to the additional information acquisition unit 65 and the transmission path decoding unit 66.

Note that, in performing the FFT of the OFDM signal, the FFT operation unit 64 can estimate the FFT size of IFFT of the OFDM signal performed in the transmission device 11 from among a plurality of predetermined FFT sizes, using a correlation of the OFDM signal or the like, for example, and can perform the FFT with the FFT size. The FFT operation unit 64 can supply the FFT size estimated from the OFDM signal to the additional information acquisition unit 65.

The additional information acquisition unit 65 acquires the additional information (for example, information corresponding to the TMCC signals and the AC signals of ISDB-T) that is the physical layer data from the OFDM signal from the FFT operation unit 64, and supplies the additional information to the transmission path decoding unit 66.

The transmission path decoding unit 66 applies predetermined transmission path decoding to the OFDM signal from the FFT operation unit 64, using the additional information supplied from the additional information acquisition unit 65 as needed, to restore the upper layer data, and supplies the upper layer data to the upper layer processing unit 52.

Here, for example, in the transmission path decoding in ISDB-T, for example, time deinterleaving, frequency deinterleaving, demapping as data carrier demodulation, error correction decoding, and the like are performed, and the upper layer data is restored. The additional information includes information of a data carrier modulation method and the like, for example, and the transmission path decoding can be performed using the additional information supplied from the additional information acquisition unit 65 to the transmission path decoding unit 66, as needed.

The upper layer processing unit 52 performs upper layer processing for the upper layer data from (the transmission path decoding unit 66) of the physical layer processing unit 51.

In other words, the upper layer processing unit 52 includes a DEMUX 71 and an upper layer data processing unit 72.

The upper layer data from the physical layer processing unit 51 is supplied to the DEMUX 71.

The DEMUX 71 separates encoded image and audio from the upper layer data from the physical layer processing unit 51, and supplies the encoded image and audio to the upper layer data processing unit 72.

The upper layer data processing unit 72 decodes the encoded image and audio from the DEMUX 71 and supplies the decoded image and audio to the output device 13 (FIG. 3).

Figure 8:
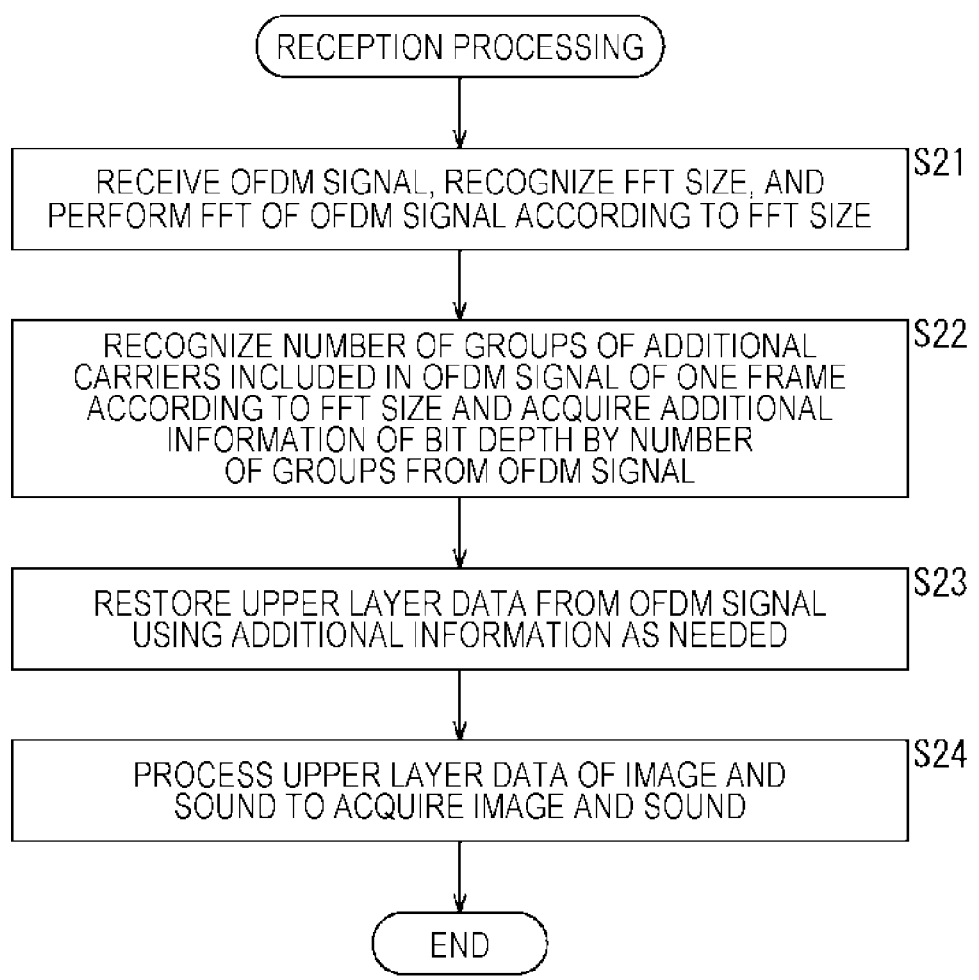
FIG. 8 is a flowchart for describing reception processing performed by the reception device 12.

FIG. 8 is a flowchart for describing reception processing performed by the reception device 12 in FIG. 7.

In the reception processing, the OFDM signal as the transmission data is received, and the upper layer processing of acquiring the image and audio included in the upper layer data included in the OFDM signal is performed.

Specifically, in step S21, the tuner 61 of the physical layer processing unit 51 receives the OFDM signal as the transmission data transmitted from the transmission device 11, and supplies the OFDM signal to the ADC 62. The ADC 62 performs AD conversion of the OFDM signal from the tuner 61 and supplies the OFDM signal to the orthogonal demodulation unit 63. The orthogonal demodulation unit 63 performs orthogonal demodulation of the OFDM signal from the ADC 62 and supplies the OFDM signal to the FFT operation unit 64.

The FFT operation unit 64 recognizes the FFT size by estimating the FFT size from the OFDM signal from the Orthogonal demodulation unit 63, and performs FFT of the OFDM signal according to the FFT size. The FFT operation unit 64 supplies the OFDM signal after the FFT to the additional information acquisition unit 65 and the transmission path decoding unit 66 and supplies the FFT size to the additional information acquisition unit 65, and the processing proceeds from step S21 to step S22.

In step S22, the additional information acquisition unit 65 recognizes the number of groups Ng of the additional carriers included in the OFDM segments (OFDM symbol) configuring the OFDM frame that is the OFDM signal of one frame from the FFT operation unit 64 according to the FFT size from the FFT operation unit 64.

Moreover, the additional information acquisition unit 65 acquires (modulates) the additional information corresponding to the number of groups Ng, in other words, the additional information of the bit depth of the number of groups Ng, from the additional carriers included in the OFDM segments configuring the OFDM frame from the FFT operation unit 64 and supplies the additional information to the transmission path decoding unit 66, and the processing proceeds from step S22 to step S23.

In step S23, the transmission path decoding unit 66 applies transmission path decoding to the OFDM frame from the FFT operation unit 64, using the additional information from the additional information acquisition unit 65, as needed, to restore the upper layer data and supplies the upper layer data to the upper layer processing unit 52, and the processing proceeds to step S24.

In step S24, in the upper layer processing unit 52, the DEMUX 71 separates the coded image and audio from the upper layer data from (the transmission path decoding unit 66) of the physical layer processing unit 51 and supplies the image and audio to the upper layer data processing unit 72.

Moreover, in step S24, the upper layer data processing unit 72 performs processing such as decoding of the encoded image and audio from the DEMUX 71 to restore (acquire) the original image and audio, and supplies the original image and audio to the output device 13 (FIG. 3).

In the reception device 12, the above reception processing is repeatedly performed in the pipeline.

Note that, in FIG. 8, in the reception device 12, the FFT operation unit 64 recognizes the FFT size of the OFDM signal by estimating the FFT size from the OFDM signal. However, the FFT operation unit 64 can recognize the FFT size by signaling, for example.

In other words, in the transmission device 11, the OFDM frame is configured including an OFDM symbol serving as a preamble, and the preamble can include signaling of FFT size information.

In this case, the reception device 12 can recognize the FFT size from the preamble included in the OFDM frame, and can further recognize the number of groups of the additional carriers of the OFDM segment according to the FFT size.

Furthermore, in a case where the OFDM frame is configured including the OFDM symbol serving as the preamble, the preamble can include signaling of information of the number of groups of the additional carriers of the OFDM segment together with or in place of the information of the FFT size.

In this case, the reception device 12 can directly recognize the number of groups of the additional carriers of the OFDM segment from the preamble included in the OFDM frame.

Note that, in the above description, (the OFDM symbol configuring) the OFDM frame is configured by a plurality of OFDM segments. However, the present technology can also be applied to an OFDM frame without division in a frequency direction according to the concept of such an OFDM segment, in addition to the OFDM frame configured by the OFDM segments.

<Example of Grouping Patterns of Additional Carriers According to FFT Sizes>

FIG. 9 is a diagram illustrating examples of grouping patterns of the additional carriers according to the FFT sizes.

FIG. 9 illustrates examples of grouping patterns of the additional carriers in a case where the size setting unit 41 (FIG. 4) sets 8K points, 16K points, or 32K points as the FFT size.

Note that, in FIG. 9, for example, the OFDM symbol is configured by 13 OFDM segments, and the additional carriers of each OFDM segment transmit the same additional information. Moreover, in the case where the FFT size is 8K points, the OFDM segment includes 432 carriers (subcarriers). Furthermore, in the case where the FFT size is 16K points (=8K points×2), the OFDM segment includes 432×2 carriers, which are twice the carriers of the case where the FFT size is 8K points. In a case where the FFT size is 32K points (=8K points×4), the OFDM segment includes 432×4 carriers, which are four times the carriers of the case where the FFT size is 8K points.

Moreover, in FIG. 9, in the case where the FFT size is 8K points, there are 12 additional carriers (12 carriers/segment) per OFDM segment including 432 carriers, in the case where the FFT size is 16K points (=8K points×2), there are 24=12×2 additional carriers, which are twice the additional carriers of the case where the FFT size is 8K points, per OFDM segment including 432×2 carriers, and in the case where the FFT size is 32K points (=8K points×4), there are 48=12×4 additional carriers, which are four times the additional carriers of the case where the FFT size is 8K points, per OFDM segment including 432×4 carriers.

Furthermore, in FIG. 9, a group index for specifying a type of grouping pattern of the additional carriers is introduced so that the grouping pattern of the additional carriers can be selected from among several types in the same FFT size.

According to FIG. 9, in a case where 1 is specified as the group index, for example, the 12 additional carriers about the FFT size of the 8K points are grouped into one group (Num. of groups (Ng)) having the 12 additional carriers (carriers/segment) as members, the 24 additional carriers about the FFT size of the 16K points are grouped into one group having the 24 additional carriers as members, and the 48 additional carriers about the FFT size of the 32K points are grouped into one group having the 48 additional carriers as members.

Furthermore, according to FIG. 9, in a case where 6 is specified as the group index, for example, the 12 additional carriers about the FFT size of the 8K points are grouped into 12 group each having one additional carrier as a member, the 24 additional carriers about the FFT size of the 16K points are grouped into 8 groups each having the 3 additional carriers as members, and the 48 additional carriers about the FFT size of the 32K points are grouped into 8 groups each having 6 additional carriers as members.

Note that the number of OFDM segments constituting the OFDM symbol is not limited to 13, and may be, for example, 33, 35, or the like. Moreover, the number of carriers included in the OFDM segment is not limited to 432, 432×2, or 432×4.

Regarding the grouping pattern of the additional carriers according to the FFT size, for example, only a set the FFT size and the group index to be used in the transmission device 11 can be defined according to the standard or the like. In this case, the reception device 12 can perform FFT with the FFT size defined in the standard, and can acquire the additional information from the additional carriers according to the grouping pattern specified in the group index defined in the standard.

Furthermore, regarding the grouping pattern of the additional carriers according to the FFT size, for example, a plurality of sets of the FFT size and the group index usable in the transmission device 11 can be defined according to the standard or the like. In this case, a set of the FFT size and the group index to be used in an actual operation of the transmission device 11 can be determined according to an operation rule from among the plurality of sets of the FFT size and the group index defined in the standard. In this case, the reception device 12 can perform FFT with the FFT size defined in the operation rule, and can acquire the additional information from the additional carriers according to the grouping pattern specified in the group index defined in the operation rule.

In addition, in the case of defining the plurality of sets of the FFT size and the group index usable in the transmission device 11 by the standard or the like, the reception device 12 can specify the FFT size and the group index used in the transmission device 11, as described below.

In other words, the reception device 12 performs, for example, FFT with each of the plurality of FFT sizes defined in the standard, and attempts physical layer processing such as acquiring the additional information from the additional carriers grouped with the grouping pattern specified in each of the plurality of group indexes defined in the standard, and can specify the FFT size and the group index used in the transmission device 11 according to a result of CRC, a result of the transmission path coding, and the like, for example, obtained in the physical layer processing.

Furthermore, for example, in the transmission device 11, the OFDM frame including the FFT size signaling as signaling for informing the FFT size and the group index used in the transmission device 11 is configured, and the reception device 12 can specify the FFT size and the group index used in the transmission device 11 by the FFT size signaling included in the OFDM frame.

The FFT size signaling can include a GI length and the like, for example, as needed, in addition to the FFT size and the information of the group index. Furthermore, in a case where the group index used in the transmission device 11 is a predetermined default group index, for example, the FFT size signaling can be configured without including the information of the group index.

Regarding the FFT size signaling, one or a plurality of OFDM symbols as a frame synchronization symbol is arranged in a head of the OFDM frame, and the FFT size signaling can be included in the frame synchronization symbol, for example.

<Example of OFDM Frame Having Frame Synchronization Symbol>

Figure 10:
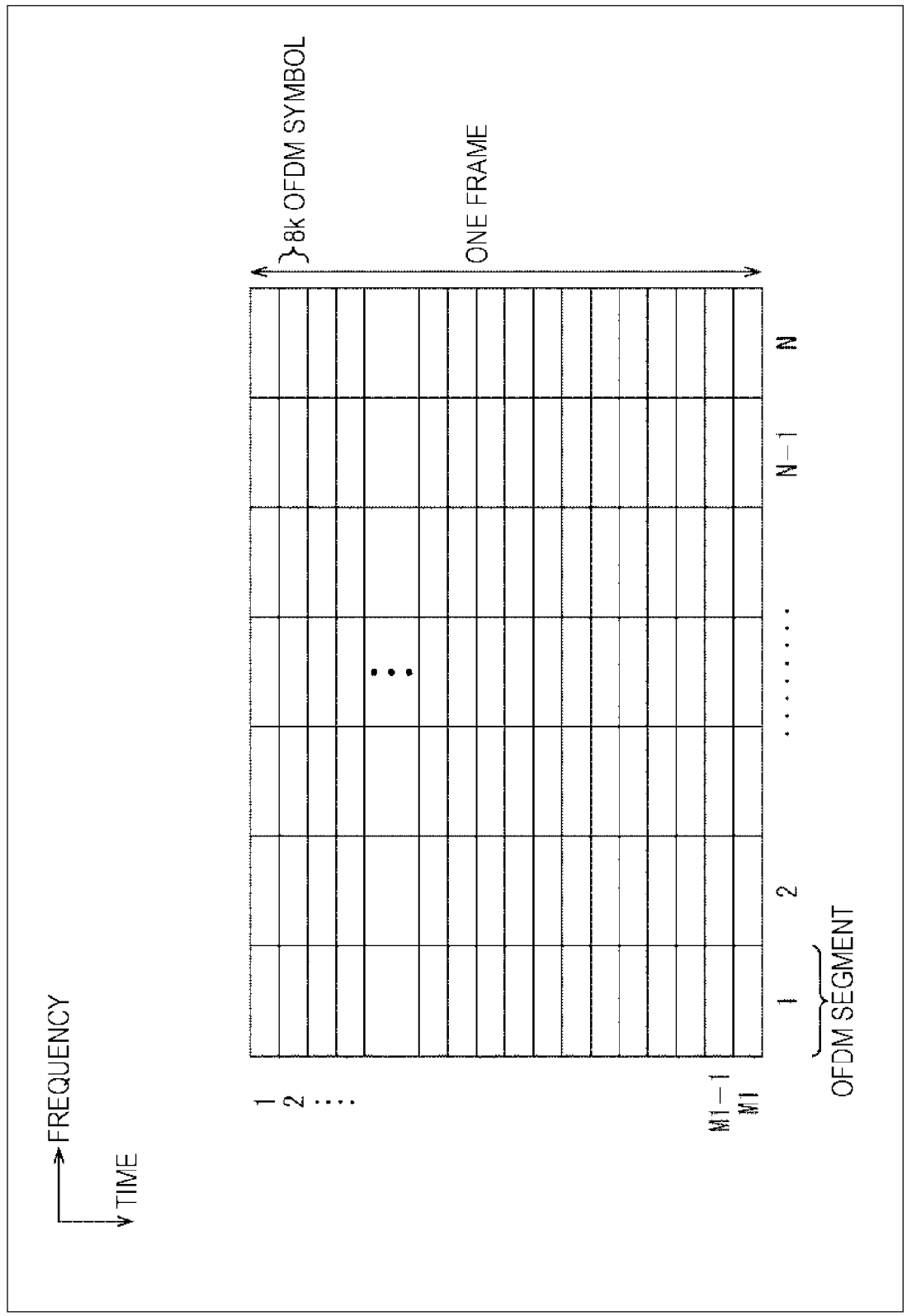
FIG. 10 is a diagram illustrating an example of an OFDM frame without including a frame synchronization symbol.

FIG. 10 is a diagram illustrating an example of an OFDM frame without including a frame synchronization symbol.

In FIG. 10, the horizontal direction represents the frequency and the vertical direction represents the time. This also similarly applies to FIGS. 11 to 13 as described below.

In FIG. 10, the OFDM symbol is configured by N OFDM segments. This also similarly applies to FIGS. 11 to 13 as described below.

Furthermore, in FIG. 10, the OFDM symbol is an OFDM symbol with the FFT size of 8K points, in other words, an OFDM symbol for which FFT and IFFT are performed with the FFT size of 8K points. The OFDM frame is configured by M1 OFDM symbols.

Figure 11:
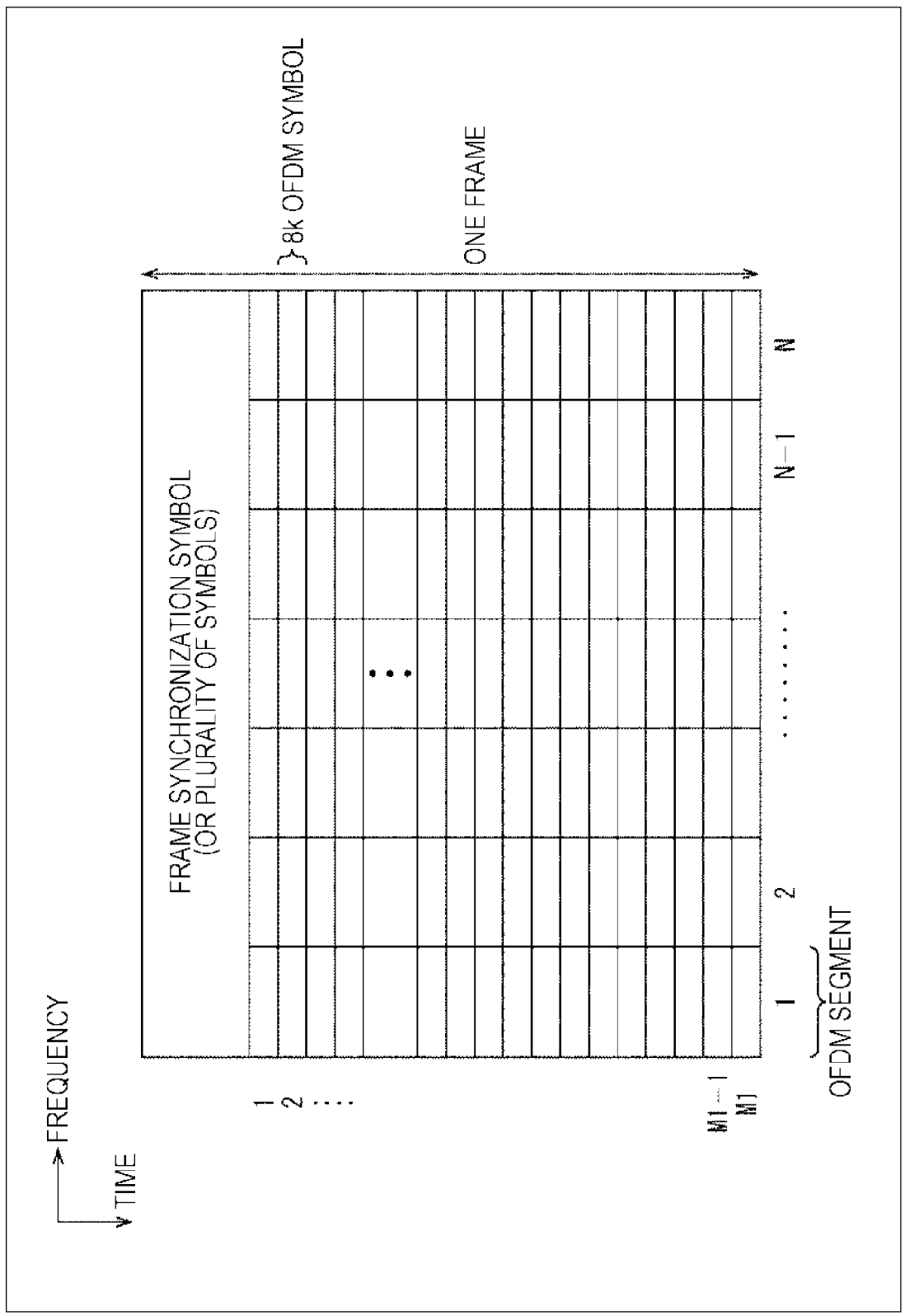
FIG. 11 is a diagram illustrating a first example of an OFDM frame including a frame synchronization symbol.

FIG. 11 is a diagram illustrating a first example of an OFDM frame including a frame synchronization symbol.

In FIG. 11, the OFDM symbol is an OFDM symbol with the FFT size of 8K points, similarly to FIG. 10, and the OFDM frame is configured by M1+1 OFDM symbols in which one OFDM symbol as the frame synchronization symbol including the FFT size signaling is included in the head of the M1 OFDM symbols in FIG. 10.

As the FFT size signaling, for example, 8 bits or the like can be adopted. For example, according to 8-bit FFT size signaling, $256=2^8$ kinds of information can be transmitted.

Note that the same FFT size signaling can be included in each of the OFDM segments configuring the OFDM symbol as the frame synchronization symbol. In this case, the reception device 12 can acquire the FFT size signaling only by performing partial reception of one segment without receiving all of N segments, for example.

Figure 12:
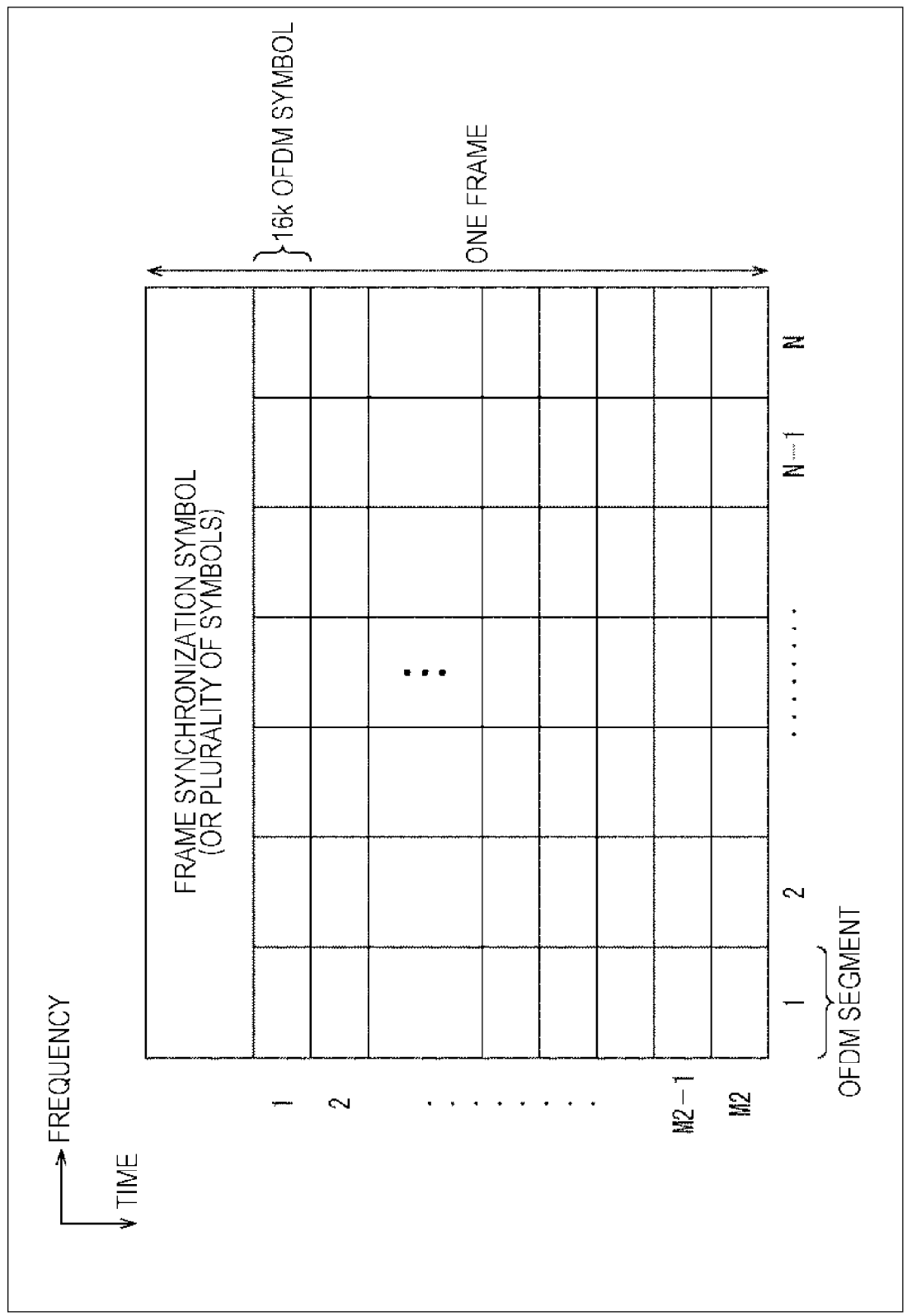
FIG. 12 is a diagram illustrating a second example of an OFDM frame including a frame synchronization symbol.

FIG. 12 is a diagram illustrating a second example of an OFDM frame including a frame synchronization symbol.

In FIG. 12, the OFDM symbol is an OFDM symbol with the FFT size of 16K points, and the OFDM frame is configured by M2 OFDM symbols less than M1 symbols in FIG. 10 or 11, and one OFDM symbol as the frame synchronization symbol arranged in the head.

Since the symbol length (time) of the OFDM symbol with the FFT size of 16K points is larger than the symbol length of the OFDM symbol with the FFT size of 8K points in FIG. 11, the OFDM frame in FIG. 12 is configured by M2+1 OFDM symbols, which is less than M1+1 OFDM symbols configuring the OFDM frame in FIG. 11, so that the frame length (time) in FIG. 12 becomes at the same level as the OFDM frame in FIG. 11. As M2, about a ½ value of M1 can be adopted, for example.

Figure 13:
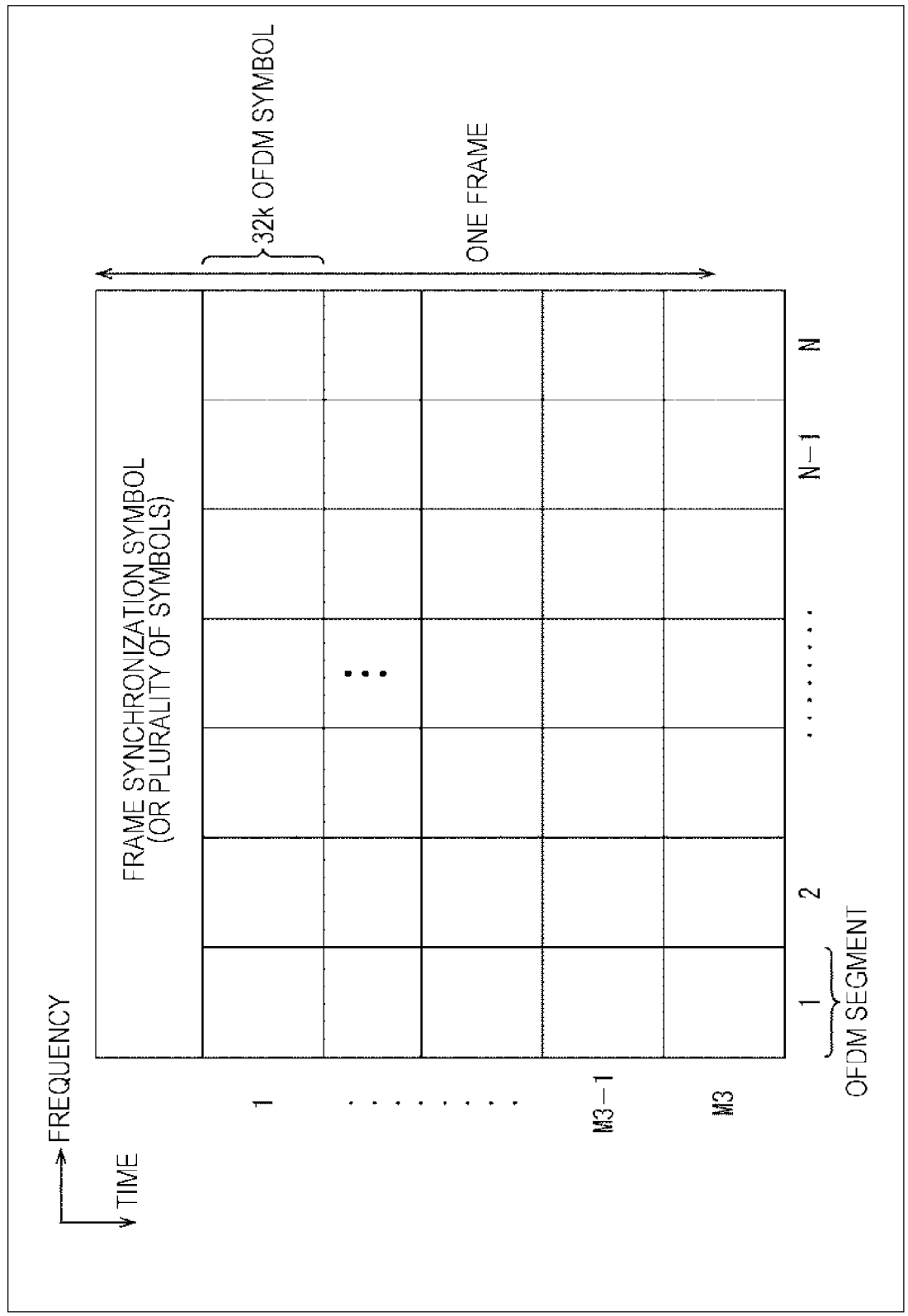
FIG. 13 is a diagram illustrating a third example of an OFDM frame including a frame synchronization symbol.

FIG. 13 is a diagram illustrating a third example of an OFDM frame having a frame synchronization symbol.

In FIG. 13, the OFDM symbol is an OFDM symbol with the FFT size of 32K points, and the OFDM frame is configured by M3 OFDM symbols less than M1 symbols in FIG. 10 or 11, and one OFDM symbol as the frame synchronization symbol arranged in the head.

Since the symbol length (time) of the OFDM symbol with the FFT size of 32K points is larger than the symbol length of the OFDM symbol with the FFT size of 8K points in FIG. 11, the OFDM frame in FIG. 13 is configured by M3+1 OFDM symbols, which is less than M1+1 OFDM symbols configuring the OFDM frame in FIG. 11, so that the frame length (time) in FIG. 13 becomes at the same level as the OFDM frame in FIG. 11. As M3, about a ¼ value of M1 (a ½ value of M2) can be adopted, for example.

<Example of FFT Size Signaling>

FIG. 14 is a diagram illustrating an example of FFT size signaling to be included in a frame synchronization symbol.

In FIG. 14, 8 bits are adopted as the FFT size signaling, and the FFT size, the GI length, the hierarchical transmission configuration, the group index, and the like are allocated to values expressed by the 8 bits.

In FIG. 14, 00000000 of the 8 bits as the FFT size signaling indicates that the FFT size is the 8K points, the GI length is ¼ the symbol length of the OFDM symbol, the hierarchical transmission of the first layer is configured by 13 segments, and the group index (Gp_Index) is 3, for example.

Furthermore, in FIG. 14, 00000001 of the 8 bits as the FFT size signaling indicates that the FFT size is the 8K points, the GI length is ¼ the symbol length of the OFDM symbol, a total of two layers of hierarchical transmission are configured where 12 segments and 1 segment are layers, respectively, and the group index is 3, for example.

<Description of Computer to Which Present Technology is Applied>

Next, at least part of the above-described series of processing of the transmission device 11 and the reception device 12 can be performed by hardware or software. In a case of executing the series of processing by software, a program that configures the software is installed in a general-purpose computer or the like.

FIG. 15 is a block diagram illustrating a configuration example of an embodiment of a computer to which a program for executing the above-described series of processing is installed.

The program can be recorded in advance in a hard disk 105 or a ROM 103 as a recording medium built in the computer.

Alternatively, the program can be stored (recorded) in a removable recording medium 111. Such a removable recording medium 111 can be provided as so-called package software. Here, examples of the removable recording medium 111 include a flexible disk, a compact disc read only memory (CD-ROM), a magneto optical (MO) disk, a digital versatile disc (DVD), a magnetic disk, a semiconductor memory, and the like.

Note that the program can be downloaded to the computer via a communication network or a broadcast network and installed in the built-in hard disk 105, in addition to the program being installed from the removable recording medium 111 to the computer, as described above. In other words, the program can be transferred in a wireless manner from a download site to the computer via an artificial satellite for digital satellite broadcasting, or transferred in a wired manner to the computer via a network such as a local area network (LAN) or the Internet, for example.

The computer incorporates a central processing unit (CPU) 102, and an input/output interface 110 is connected to the CPU 102 via a bus 101.

When a command is input through the input/output interface 110 by the user who operates an input unit 107 or the like, the CPU 102 executes the program stored in the read only memory (ROM) 103 according to the command. Alternatively, the CPU 102 loads the program stored in the hard disk 105 into a random access memory (RAM) 104 and executes the program.

As a result, the CPU 102 performs the above-described processing according to the flowchart or the above-described processing of the block diagram. Then, the CPU 102 causes an output unit 106 to output the processing result, a communication unit 108 to transmit the processing result, and the hard disk 105 to record the processing result, via the input/output interface 110, as necessary, for example.

Note that the input unit 107 is configured by a keyboard, a mouse, a microphone, and the like. Furthermore, the output unit 106 is configured by a liquid crystal display (LCD), a speaker, and the like.

Here, in the present specification, the processing performed by the computer in accordance with the program does not necessarily have to be performed in chronological order in accordance with the order described as the flowchart. In other words, the processing performed by the computer in accordance with the program also includes processing executed in parallel or individually (for example, parallel processing or processing by an object).

Furthermore, the program may be processed by one computer (processor) or may be processed in a distributed manner by a plurality of computers. Moreover, the program may be transferred to a remote computer and executed.

Moreover, in the present specification, the term "system" means a group of a plurality of configuration elements (devices, modules (parts), and the like), and whether or not all the configuration elements are in the same casing is irrelevant. Therefore, a plurality of devices housed in separate casings and connected via a network, and one device that houses a plurality of modules in one casing are both systems.

Note that embodiments of the present technology are not limited to the above-described embodiments, and various modifications can be made without departing from the gist of the present technology.

For example, in the present technology, a configuration of cloud computing in which one function is shared and processed in cooperation by a plurality of devices via a network can be adopted.

Furthermore, the steps described in the above-described flowcharts can be executed by one device or can be shared and executed by a plurality of devices.

Moreover, in the case where a plurality of processes is included in one step, the plurality of processes included in the one step can be executed by one device or can be shared and executed by a plurality of devices.

Furthermore, the effects described in the present specification are merely examples and are not limited, and other effects may be exhibited.

Note that the present technology can adopt the following configurations.

<1>

A transmission device including:

a generation unit configured to generate an orthogonal frequency division multiplexing (OFDM) signal in which additional information of a physical layer is allocated to additional carriers in each of groups, the groups being obtained by grouping the additional carriers to be used for transmission of the additional information, of carriers of the OFDM signal of one frame, into the groups of the number of groups according to a DFT size of when inverse discrete Fourier transform (IDFT) of the OFDM signal is performed; and a transmission unit configured to transmit the OFDM signal.

<2>

The transmission device according to <1>, in which the OFDM signal of one frame is configured by a plurality of OFDM symbols, the OFDM symbol is configured by a plurality of OFDM segments, and the generation unit generates the OFDM signal in which the additional information is allocated to the additional carriers in each of groups, the groups being obtained by grouping the additional carriers, of carriers of the OFDM segment, into the groups of the number of groups according to the DFT size.

<3>

The transmission device according to <2>, in which the OFDM signal of one frame is configured by a number of the OFDM symbols, the number making a frame length of the OFDM signal of one frame be a predetermined value.

<4>

The transmission device according to any one of <1> to <3>, in which the OFDM signal including the DFT size or signaling of information of the number of groups of the additional carriers is generated.

<5>

A transmission method including:

generating an orthogonal frequency division multiplexing (OFDM) signal in which additional information of a physical layer is allocated to additional carriers in each of groups, the groups being obtained by grouping the additional carriers to be used for transmission of the additional information, of carriers of the OFDM signal of one frame, into the groups of the number of groups according to a DFT size of when inverse discrete Fourier transform (IDFT) of the OFDM signal is performed; and transmitting the OFDM signal.

<6>

A reception device including:

a reception unit configured to receive an orthogonal frequency division multiplexing (OFDM) signal in which additional information of a physical layer is allocated to additional carriers in each of groups, the groups being obtained by grouping the additional carriers to be used for transmission of the additional information, of carriers of the OFDM signal of one frame, into the groups of the number of groups according to a DFT size of when inverse discrete Fourier transform (IDFT) of the OFDM signal is performed; and an acquisition unit configured to acquire the additional information corresponding to the number of groups according to the DFT size from the OFDM signal.

<7>

The reception device according to <6>, in which the OFDM signal of one frame is configured by a plurality of OFDM symbols, the OFDM symbol is configured by a plurality of OFDM segments, and the reception unit receives the OFDM signal in which the additional information is allocated to the additional carriers in each of groups, the groups being obtained by grouping the additional carriers, of carriers of the OFDM segment, into the groups of the number of groups according to the DFT size.

<8>

The reception device according to <7>, in which the OFDM signal of one frame is configured by a number of the OFDM symbols, the number making a frame length of the OFDM signal of one frame be a predetermined value.

<9>

The reception device according to any one of <6> to <8>, in which the OFDM signal includes the DFT size or signaling of information of the number of groups of the additional carrier, and the acquisition unit acquires the additional information corresponding to the number of groups of the additional carriers recognized from the signaling included in the OFDM signal.

<10>

The reception device according to any one of <6> to <8>, in which the acquisition unit acquires the additional information corresponding to the number of groups of the additional carriers recognized from the DFT size estimated from the OFDM signal.

<11>

A reception method including:

receiving an orthogonal frequency division multiplexing (OFDM) signal in which additional information of a physical layer is allocated to additional carriers in each of groups, the groups being obtained by grouping the additional carriers to be used for transmission of the additional information, of carriers of the OFDM signal of one frame, into the groups of the number of groups according to a DFT size of when inverse discrete Fourier transform (IDFT) of the OFDM signal is performed; and acquiring the additional information corresponding to the number of groups according to the DFT size from the OFDM signal.

REFERENCE SIGNS LIST

11 Transmission device
12 Reception device
13 Output device
21 Boss layer processing unit
22 Physical layer processing unit
41 Size setting unit
42 Additional information generation unit
43 Transmission path coding unit
44 IFFT operation unit
45 GI adding unit
46 Transmission unit
51 Physical layer processing unit
52 Upper layer processing unit
61 Tuner
62 ADC
63 Orthogonal demodulation unit
64 FFT operation unit
65 Additional information acquisition unit
66 Transmission path decoding unit
71 DEMUX
72 Upper layer data processing unit
101 Bus 102 CPU
103 ROM
104 RAM
105 Hard disk
106 Output unit
107 Input unit
108 Communication unit
109 Drive
110 Input/output interface
111 Removable recording medium

The invention claimed is:

1. A transmission device comprising:
   circuitry configured to:
   divide carriers of an orthogonal frequency division multiplexing (OFDM) segment into a plurality of groups, the OFDM segment configuring an OFDM symbol of an OFDM signal of one frame,
   allocate information of a physical layer to a group among the plurality of groups, each of carriers belonging to the group having the same information of the physical layer allocated to the group,
   generate the OFDM signal in which the information of the physical layer is allocated to the group, and
   transmit the OFDM signal, the OFDM signal conveying information of a number of the plurality of groups.

2. The transmission device according to claim 1, wherein the circuitry is further configured to divide the carriers into the plurality of groups according to a size of an inverse fast Fourier transform (IFFT) performed on the OFDM signal.

3. The transmission device according to claim 2, wherein the OFDM signal of one frame is configured by a number of OFDM symbols, the number making a frame length of the OFDM signal of one frame be a predetermined value.

4. The transmission device according to claim 2, wherein the OFDM signal includes the size.

5. The transmission device according to claim 2, wherein a number of carriers per group varies according to the size.

6. The transmission device according to claim 5, wherein the number of the carriers per group increases according to the size.

7. A transmission method comprising:
   dividing carriers of an orthogonal frequency division multiplexing (OFDM) segment into a plurality of groups, the OFDM segment configuring an OFDM symbol of an OFDM signal of one frame;
   allocating information of a physical layer to a group among the plurality of groups, each of carriers belonging to the group having the same information of the physical layer allocated to the group;
   generating the OFDM signal in which the information of the physical layer is allocated to the group; and
   transmitting the OFDM signal, the OFDM signal conveying information of a number of the plurality of groups.

\* \* \* \* \*